United States Patent
Yunusov et al.

(10) Patent No.: US 11,539,571 B2
(45) Date of Patent: Dec. 27, 2022

(54) IN-PHASE AND QUADRATURE-PHASE IMPAIRMENTS COMPENSATION IN SUB-TERAHERTZ COMMUNICATION

(71) Applicant: QUALCOMM Incorporated, San Diego, CA (US)

(72) Inventors: David Yunusov, Holon (IL); Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/373,215

(22) Filed: Jul. 12, 2021

(65) Prior Publication Data
US 2022/0014412 A1 Jan. 13, 2022

Related U.S. Application Data

(60) Provisional application No. 63/051,050, filed on Jul. 13, 2020.

(51) Int. Cl.
| | |
|---|---|
| H04L 27/36 | (2006.01) |
| H04L 27/38 | (2006.01) |
| H04L 27/00 | (2006.01) |
| H04W 72/04 | (2009.01) |

(52) U.S. Cl.
CPC ........ *H04L 27/364* (2013.01); *H04L 27/0014* (2013.01); *H04L 27/3863* (2013.01); *H04W 72/0413* (2013.01); *H04L 2027/0067* (2013.01)

(58) Field of Classification Search
CPC .................. H04L 27/364; H04L 2027/0067
See application file for complete search history.

(56) References Cited

U.S. PATENT DOCUMENTS

| | | | | |
|---|---|---|---|---|
| 2005/0210354 | A1* | 9/2005 | Kurokami | H03F 1/3294 714/747 |
| 2008/0123787 | A1* | 5/2008 | Wongwirawat | H04L 27/3872 375/346 |
| 2011/0003608 | A1* | 1/2011 | Forenza | H04B 7/01 455/500 |
| 2022/0077883 | A1* | 3/2022 | Emira | H04B 1/30 |

OTHER PUBLICATIONS

International Search Report and Written Opinion—PCT/US2021/041402—ISA/EPO—dated Nov. 4, 2021.
(Continued)

*Primary Examiner* — Qutbuddin Ghulamali
(74) *Attorney, Agent, or Firm* — Muncy, Geissler, Olds and Lowe

(57) ABSTRACT

IQ impairments compensation in sub-terahertz (sub-THz) communication is disclosed. According to some aspects, a user equipment (UE) determines an estimated in-phase (I) and quadrature phase (Q) impairment of the UE, the IQ impairment of the UE comprising a mismatch of phase and/or amplitude, between an I path and a Q path within an analog receiver circuitry of the UE, and reports the estimated IQ impairment of the UE to a base station (BS). The BS determines a pre-compensation to compensate for the estimated IQ impairment of the UE and uses the determined pre-compensation when transmitting to the UE.

30 Claims, 11 Drawing Sheets

(56) References Cited

OTHER PUBLICATIONS

Jee J., et al., "A Comparative Study on the Compensation Schemes for Transceiver I/Q Imbalances of Massive MIMO System", 2019 25th Asia-Pacific Conference on Communications (APCC), IEEE, Nov. 6, 2019 (Nov. 6, 2019), pp. 292-296, XP033732123, DOI: 10.1109/APCC47188.2019.9026458 [retrieved on Mar. 5, 2020] See Section I.

Jee J., et al., "Regularized Zero-Forcing Precoder for Massive MIMO System With Transceiver I/Q Imbalances", IEEE Wireless Communications Letters, IEEE, Piscataway, NJ, USA, vol. 8, No. 4, Aug. 1, 2019 (Aug. 1, 2019), pp. 1028-1031, XP011741357, ISSN: 2162-2337, DOI: 10.1109/LWC.2019.2904496 [retrieved on Aug. 20, 2019] See Sections I. III.

Liu Z-J., et al., "Impact and Compensation of I/Q Imbalance on Channel Reciprocity of Time-Division-Duplexing Multiple-Input Multiple-Output Systems", IET Communications, The Institution of Engineering and Technology, GB, vol. 7, No. 7, May 1, 2013 (May 1, 2013), pp. 663-672, XP006095728, ISSN: 1751-8628, DOI: 10.1049/IET-COM.2012.0620, See Section 4.1.

\* cited by examiner

IN-PHASE AND QUADRATURE-PHASE IMPAIRMENTS COMPENSATION IN SUB-TERAHERTZ COMMUNICATION

CROSS-REFERENCE TO RELATED APPLICATION

This application claims priority to U.S. Provisional Patent Application No. 63/051,050, filed Jul. 13, 2020, entitled "IQ IMPAIRMENTS COMPENSATION IN SUB-TERAHERTZ COMMUNICATION," which is assigned to the assignee hereof and is expressly incorporated herein by reference in its entirety.

BACKGROUND OF THE DISCLOSURE

1. Field of the Disclosure

Aspects of the disclosure relate generally to wireless communications and to techniques and apparatuses related to in-phase (I) and quadrature-phase (Q) impairments compensation in sub-terahertz (sub-THz) communication.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

In cellular communications networks, downlink transmission is transmission from a base station to a wireless device, such as a mobile phone. 5G NR downlink uses orthogonal frequency division multiplexing (OFDM), which is a technique that splits a radio signal into multiple smaller sub-signals that are then transmitted simultaneously at different frequencies to the receiver. Digital receivers still employ analog components in the demodulation process, which can suffer imbalances between the in-phase (I) and quadrature-phase (Q) branches. The resulting distortion degrades performance and introduces a noise floor that limits the operational signal to noise ratio (SNR) at the receiver side. Compensation for these imbalances is conventionally performed at the receiver, using digital filters. The filtering operation consumes a significant amount of power, however, and for mobile phones, this reduces battery life. The power used is proportional to the bandwidth of the transmission.

There is a trend towards very high bandwidths, e.g., 10 gigahertz (GHz) or more, in sub-terahertz (sub-THz) communications. Power consumption increases proportionally with bandwidth, and IQ imbalance compensation in the digital portion accounts for a large part of that power consumption. Thus, as bandwidth increases, power consumption increases, especially for high bandwidth operation, which is a problem for battery operated devices such as mobile phones. Therefore, the current millimeter wave (MMW) architecture solution impractical to reuse in sub-THz systems. Accordingly, there is a need for an IQ impairments compensation in sub-THz communication that is suitable for battery operated receivers.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

A user equipment (UE) transceiver circuit includes an analog portion and a digital portion. One function of the digital portion of an OFDM transceiver is to provide a filtering function that corrects for, among other things, OFDM symbol errors caused by imbalances between the in-phase (I) and quadrature-phase (Q) branches of the analog portion of the UE's receiver circuit. This filtering function consumes a significant portion of power, proportional to the UE's bandwidth. For very high bandwidths, the power required for the digital filtering function of the receive signal becomes prohibitive for UEs and other battery-powered devices.

Embodiments of the disclosure are directed to alleviating the filtering burden on the UE by having the base station (BS) pre-compensate the downlink (DL) transmissions to the UE such that the filtering function on the UE is reduced (e.g., by reducing the number of taps) or eliminated entirely (e.g., by disabling, eliminating, or bypassing the receiver digital filter). In particular, the UE estimates its own IQ imbalance and provides a description of that IQ imbalance to the BS in an uplink (UL) message; the BS calculates an appropriate pre-compensation to be applied to subsequent DL transmissions to the UE. Upon receiving the pre-compensated DL transmissions, the UE may determine that it may reduce or eliminate its own filtering operations, which reduces the UE's power consumption, especially for very high bandwidth operation, compared to conventional approaches.

In an aspect, a method of operating a user equipment (UE) includes determining an estimated in-phase (I) and quadrature phase (Q) impairment of the UE, the IQ impairment of the UE comprising a mismatch of phase and/or amplitude, between an I path and a Q path within an analog receiver circuitry of the UE; and reporting the estimated IQ impairment of the UE to a base station (BS).

In an aspect, a method of operating a base station (BS) includes receiving, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE; determining a pre-compensation to compensate for the estimated IQ impairment of the UE; and using the determined pre-compensation when transmitting to the UE.

In an aspect, a user equipment (UE) includes a memory; at least one transceiver; and at least one processor communicatively coupled to the memory and the at least one transceiver, the at least one processor configured to: determine an estimated in-phase (I) and quadrature phase (Q) impairment of the UE, the IQ impairment of the UE comprising a mismatch of phase and/or amplitude, between an I path and a Q path within an analog receiver circuitry of the UE; and report the estimated IQ impairment of the UE to a base station (BS).

In an aspect, a BS includes a memory; at least one transceiver; and at least one processor communicatively coupled to the memory and the at least one transceiver, the at least one processor configured to: receive, via the at least one transceiver, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE; determine a pre-compensation to compensate for the estimated IQ impairment of the UE; and use the determined pre-compensation when transmitting to the UE.

In an aspect, a user equipment (UE) includes means for determining an estimated in-phase (I) and quadrature phase (Q) impairment of the UE, the IQ impairment of the UE comprising a mismatch of phase and/or amplitude, between an I path and a Q path within an analog receiver circuitry of the UE; and means for reporting the estimated IQ impairment of the UE to a base station (BS).

In an aspect, a BS includes means for receiving, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE; means for determining a pre-compensation to compensate for the estimated IQ impairment of the UE; and means for using the determined pre-compensation when transmitting to the UE.

In an aspect, a non-transitory computer-readable medium storing computer-executable instructions that, when executed by a user equipment (UE), cause the UE to: determine an estimated in-phase (I) and quadrature phase (Q) impairment of the UE, the IQ impairment of the UE comprising a mismatch of phase and/or amplitude, between an I path and a Q path within an analog receiver circuitry of the UE; and report the estimated IQ impairment of the UE to a base station (BS).

In an aspect, a non-transitory computer-readable medium storing computer-executable instructions that, when executed by a BS, cause the BS to: receive, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE; determine a pre-compensation to compensate for the estimated IQ impairment of the UE; and use the determined pre-compensation when transmitting to the UE.

Aspects generally include a method, apparatus, system, computer program product, non-transitory computer-readable medium, user equipment, Internet of Things (IoT) or cellular IoT (C-IoT) user equipment, base station, wireless communication device, and/or processing system as substantially described with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings, wherein like reference numbers represent like parts, which are presented solely for illustration and not limitation of the disclosure. In accordance with common practice, some of the drawings are simplified for clarity. Thus, the drawings may not depict all components of a particular apparatus or method.

DETAILED DESCRIPTION

Figure 1:
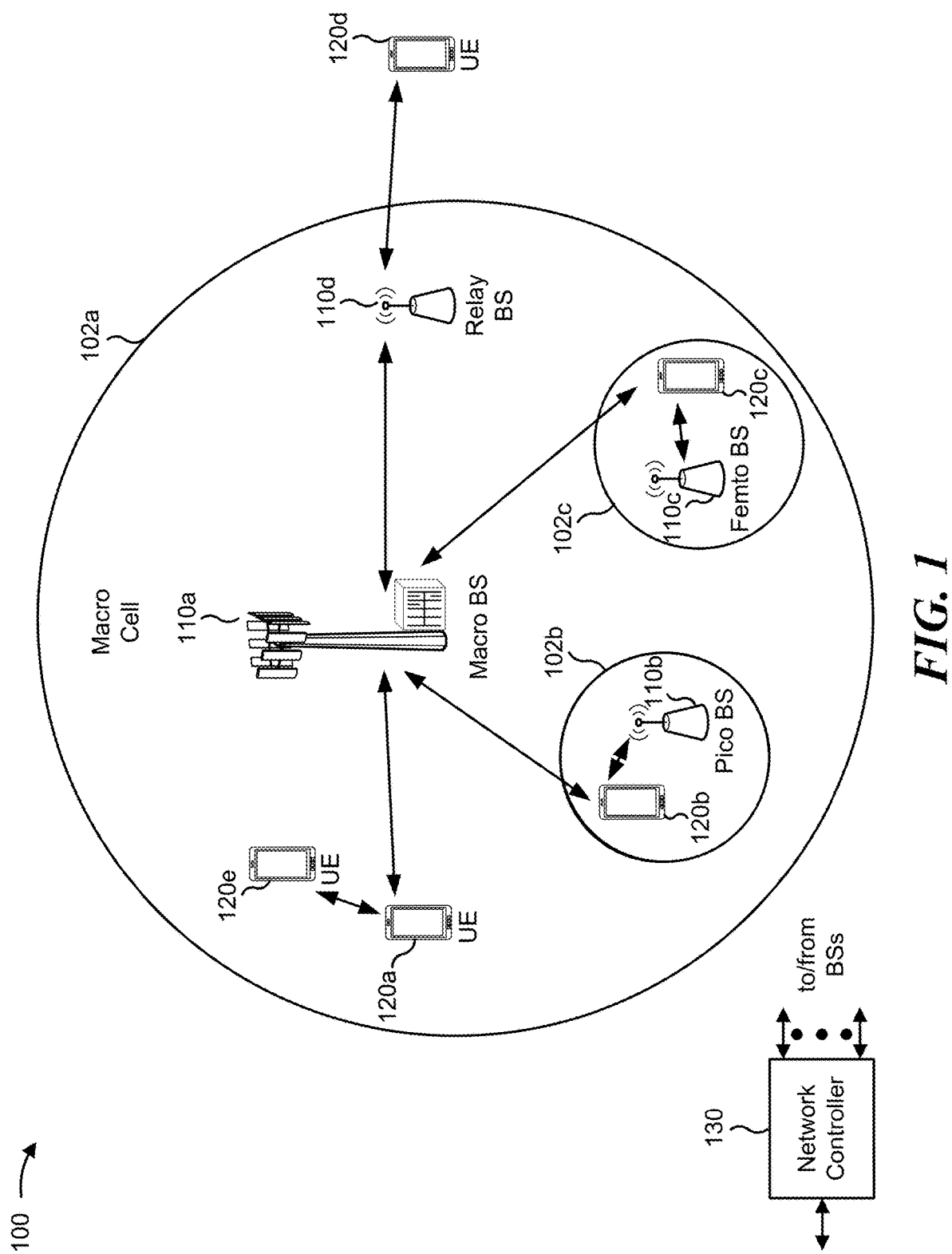
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a 5G BS, a Node B (NB), a gNB, a 5G NB, an access point, a transmit receive point (TRP), and/or the like. Each BS may provide communication coverage for a particular geographic area. In Third Generation Partnership Project (3GPP) standards, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "5G BS", "gNB", "TRP", "access point (AP)", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described in FIG. 1.

Figure 2:
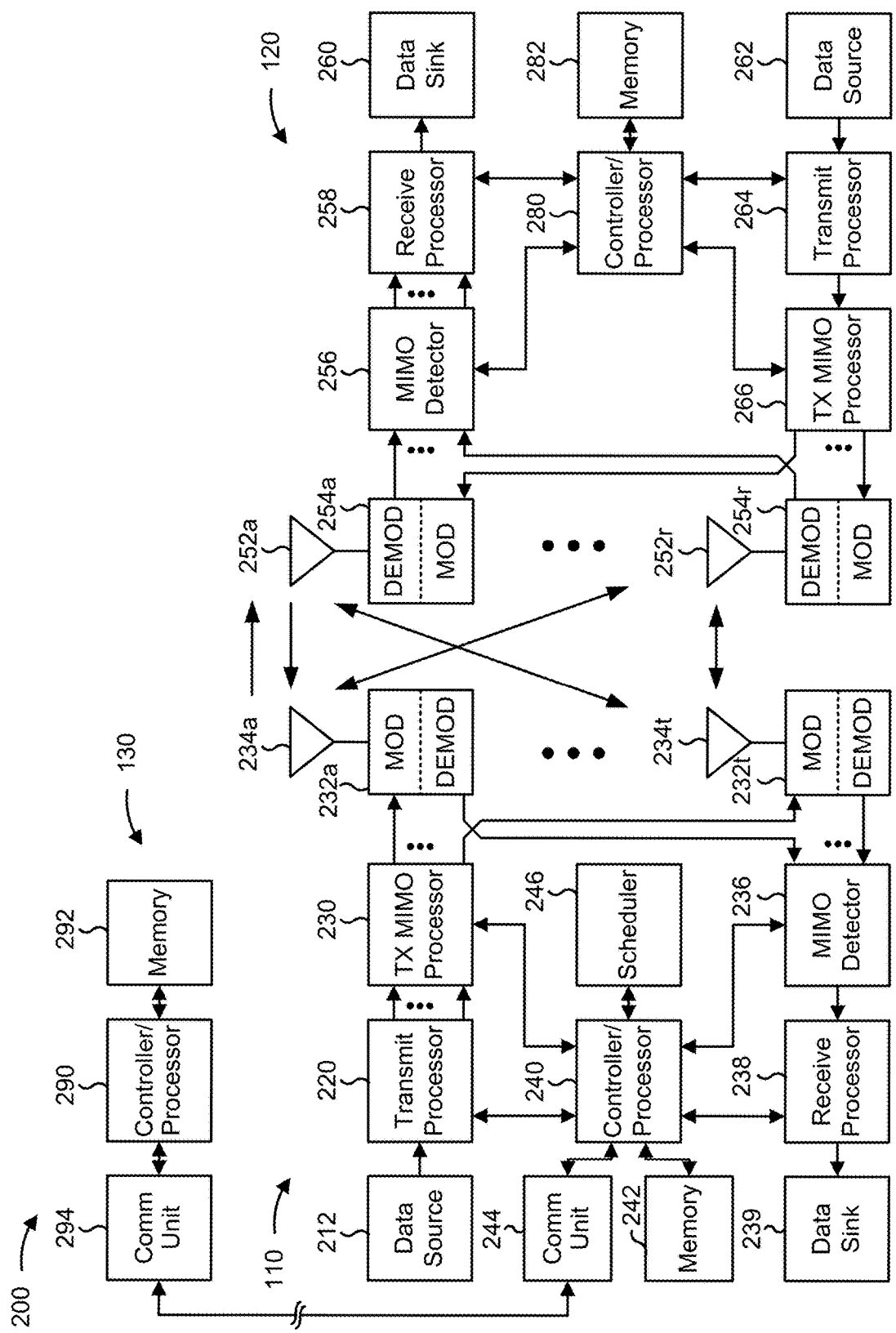
FIG. 2 is a diagram illustrating an example of a base station in communication with a UE in a wireless communication network.

FIG. 2 shows a block diagram 200 of a design of base station (BS) 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit (TX) processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. TX processor 220 may also process system information (e.g., for semi-static resource partitioning information (SRPI), and/or the like) and control information (e.g., CQI requests, grants, upper layer signaling, and/or the like) and provide overhead symbols and control symbols. TX processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t, which may be singly or collectively referred to as modulator(s)

232. Each modulator 232 may process a respective output symbol stream (e.g., for orthogonal frequency divisional multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively, which may be singly or collectively referred to as antenna(s) 234. According to various aspects described in more detail below, the synchronization signals can be generated with location encoding to convey additional information.

At UE 120, antennas 252a through 252r, which may be singly or collectively referred to as antenna(s) 252, may receive the downlink signals from BS 110 and/or other base stations and may provide received signals to demodulators (DEMODs) 254a through 254r, respectively, which may be singly or collectively referred to as demodulator(s) 254. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive (RX) processor 238 to obtain decoded data and control information sent by UE 120. RX processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 2 may perform one or more techniques associated with UAC parameter updating, as described in more detail elsewhere herein. For example, controller/processor 240 of BS 110, controller/processor 280 of UE 120, and/or any other component(s) of FIG. 2 may perform or direct operations of various processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

As noted above, various device types may be characterized as UEs. Starting in 3GPP Rel. 17, a number of these UE types are being allocated a new UE classification denoted as 'NR-Light'. Examples of UE types that fall under the NR-Light classification include wearable devices (e.g., smart watches, etc.), industrial sensors, video cameras (e.g., surveillance cameras, etc.), and so on. Generally, the UE types grouped under the NR-Light classification are associated with lower communicative capacity. For example, relative to 'normal' UEs (e.g., UEs not classified as NR-Light), NR-Light UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some NR-Light UEs may also be sensitive in terms of power consumption (e.g., requiring a long battery life, such as several years) and may be highly mobile. Moreover, in some designs, it is generally desirable for NR-Light UEs to co-exist with UEs implementing protocols such as enhanced mobile broadband (eMBB), ultra-reliable low-latency communication (URLLC), LTE NB-IoT/MTC, and so on.

Figure 3:
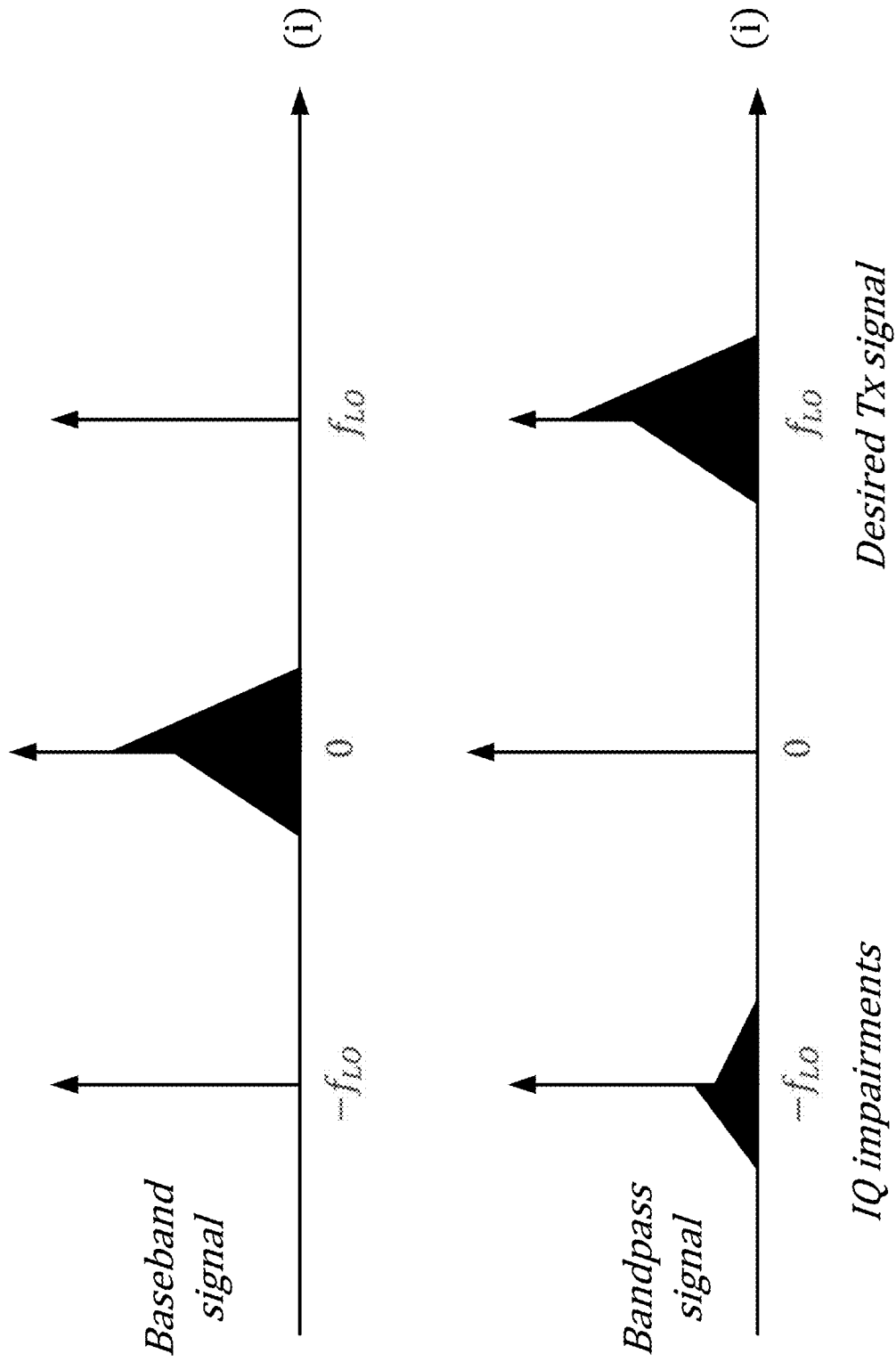
FIG. 3 illustrates some of the problems caused by in-phase (I) and quadrature-phase (Q) impairments in an analog receiver circuit.

FIG. 3 illustrates some of the problems caused by in-phase (I) and quadrature-phase (Q) impairments in an analog receiver circuit. FIG. 3 shows two frequency plots, labeled (i) and (ii) with frequency along the X axis (also referred to herein as the "frequency axis") and signal strength along the Y axis (also referred to herein as the "power axis"). Three frequencies of interest are shown: the center or baseband frequency, labeled "0" on the frequency axis; the upper sideband frequency, labeled "$f_{LO}$" on the frequency axis; and the lower sideband frequency, labeled "$-f_{LO}$" on the frequency axis.

Frequency plot (i) shows the baseband signal being generated at a center frequency. Frequency plot (ii) shows the desired transmitted signal at frequency $f_{LO}$. In this example, the analog front-end has I and Q paths that are mismatched by phase and/or amplitude. As a result, a mirrored image signal occurs at frequency $-f_{LO}$.

Figure 4:
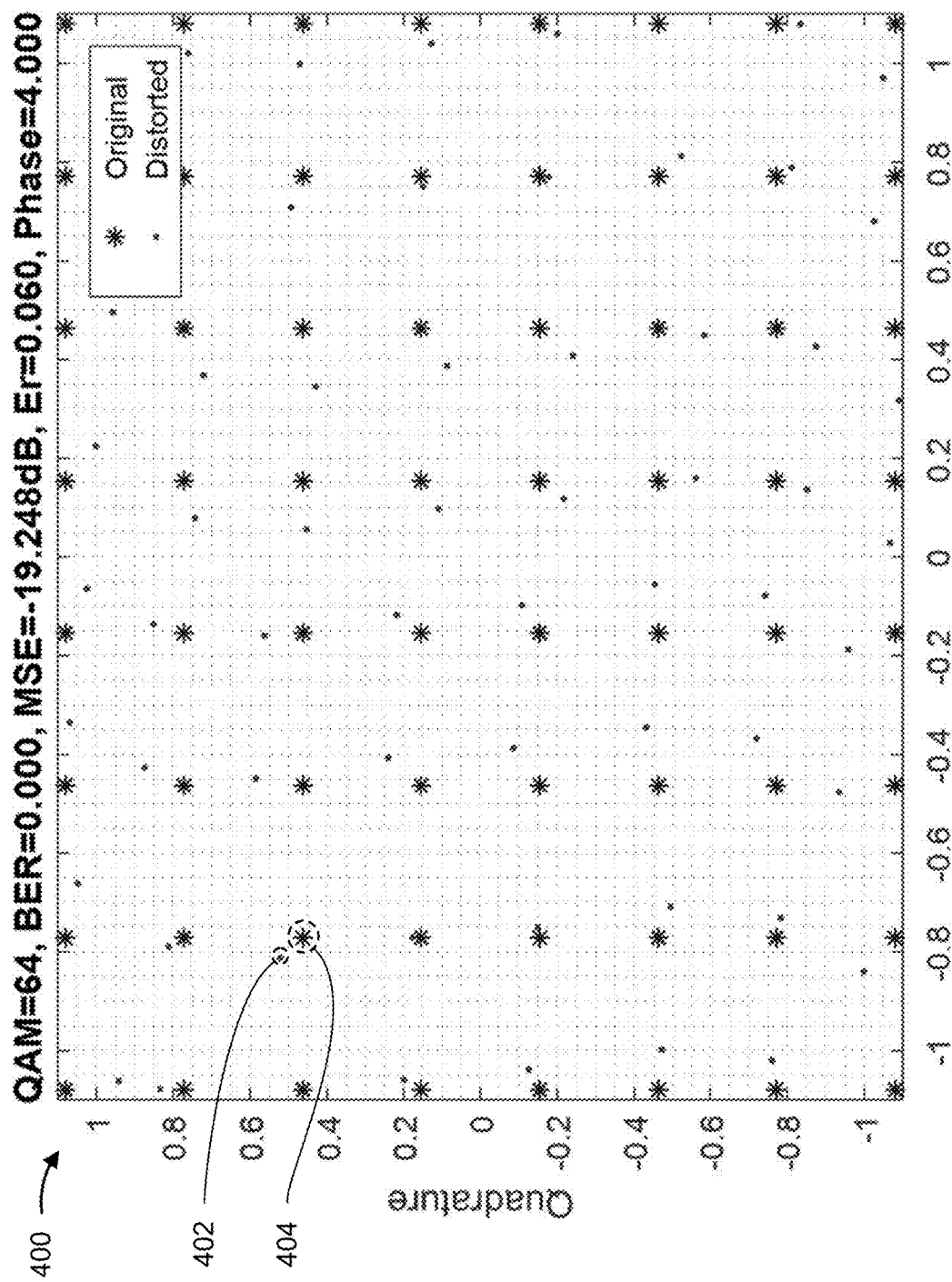
FIG. 4 is a plot showing actual versus ideal constellation points for a 64-point quadrature amplitude modulation (QAM) implementation, showing the effects of IQ impairments.
Figure 5:
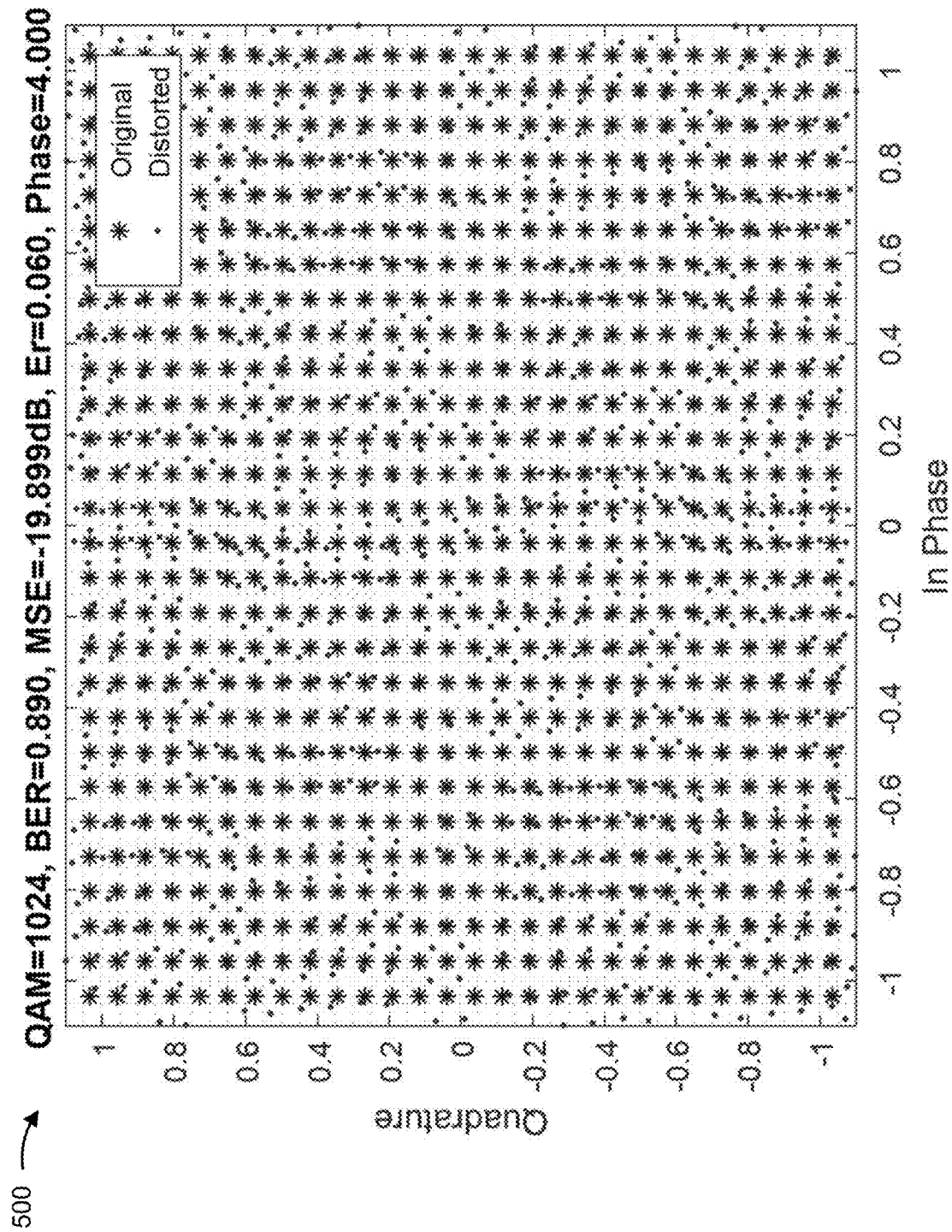
FIG. 5 is a plot showing actual versus ideal constellation points for a 1024-point quadrature amplitude modulation (QAM) implementation, showing the effects of IQ impairments.

Moreover, error vector magnitude (EVM) is a measure of the quality of the performance of a digital transmitter or receiver and is a measure of the deviation of the actual constellation points from their ideal locations, due to both magnitude and phase errors. The IQ impairment of the UEs of the receiver also cause such deviations, increasing the EVM of the receiver. FIG. 4 and FIG. 5 illustrate examples of such deviations.

FIG. 4 includes a plot 400 of actual constellation points, such as point 402, versus their ideal locations, such as location 404, for an analog receiver suffering IQ impairments. This plot is for a quadrature amplitude modulation (QAM) implementation having sixty four different constellation points, referred to as 64-QAM. In this example, the actual constellation points are not in their ideal locations due to distortions caused by IQ impairments of the receiver. However, even with an amplitude error $E_r$ of 0.6 and a phase error of four degrees, the bit error rate (BER) is acceptably low, because it is easy to determine which ideal constellation point to which the actual constellation point should be mapped. The same is not true in FIG. 5, however.

FIG. 5 includes a plot 500 of actual constellation points (distorted) versus ideal constellation points (original) for a 1024-QAM implementation having the same $E_r$ and phase error as the 64-QAM implementation in FIG. 4. In FIG. 5, however, it is difficult to determine to which ideal constellation point the actual constellation point should be mapped. As a result, the BER is quite high, with a value of 0.890. However, both FIG. 4 and FIG. 5 show a mean square error (MSE) of between −19 and −20 dB.

Comparing FIG. 4 to FIG. 5, it can be seen that constellation type has no impact on IQ impairments MSE, and that with larger constellations it may be necessary to minimize MSE.

Figure 6:
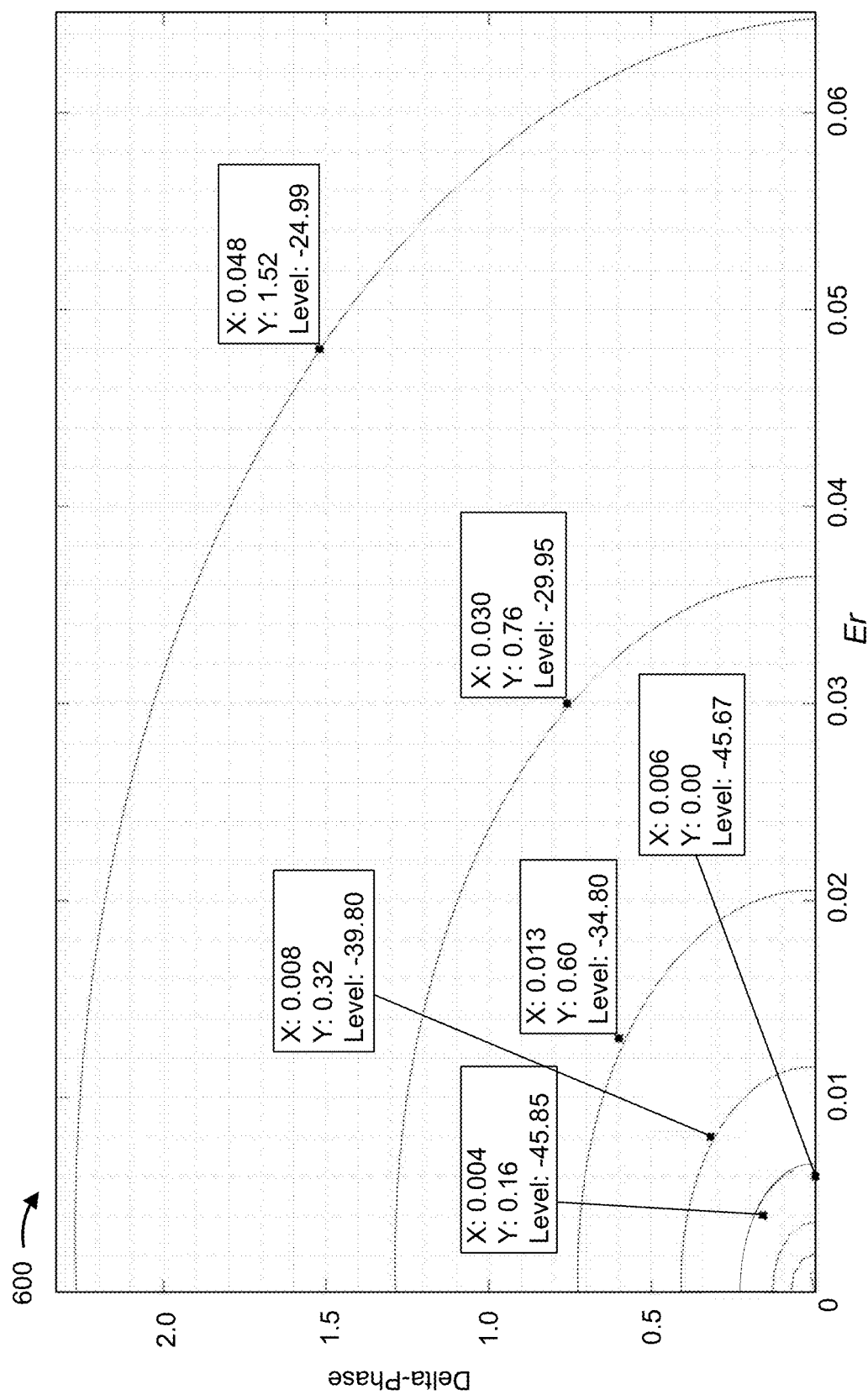
FIG. 6 is a plot illustrating mean square error (MSE) level as a function of severity of IQ impairments.

FIG. 6 is a plot 600 illustrating MSE level as a function of severity of IQ impairments of amplitude error ($E_r$) on the X axis and phase error (Delta-Phase) on the Y axis. Systems with low IQ impairments, e.g., $E_r$=0.004 and Delta-Phase=0.16, have a relatively low MSE of −45.85 dB, while systems with high IQ impairments, e.g., $E_r$=0.48 and Delta-Phase=1.52, have a relatively high MSE of −24.99 dB.

In sub-THz communication, the expected bandwidth (BW) will be approximately 10 GHz; in such a high BW, the sampling interval T is smaller and thus more sensitive to IQ impairments. Single Carrier OFDM (SC-OFDM) systems are even more sensitive to IQ impairments. For example, if I and Q have a mismatch (skew) of 1 sample, a SC-OFDM system will not be able to decode the data at all, even for a low constellation count.

Thus, there is a need for accurate IQ compensation in Sub-THz. Conventional approaches, including the approach currently used in MMW communication, is to use filters with a high number of filter taps; this also increases power consumption at the receiver. Since IQ impairments have a major impact in Sub-THz communication, and since compensation in the digital domain using filters is very high cost in terms of power consumption at the UE, an approach that involves pre-compensating the signal at the gNB side is presented.

Embodiments of the disclosure are directed to alleviating the filtering burden on the UE by having the base station (BS) pre-compensate the downlink (DL) transmissions to the UE such that the filtering function on the UE is reduced (e.g., by reducing the number of taps) or eliminated entirely (e.g., by disabling, eliminating, or bypassing the receiver digital filter). In one aspect, the UE estimates its own IQ imbalance and provides a description of that IQ imbalance to the BS in an uplink (UL) message; the BS calculates an appropriate pre-compensation to be applied to subsequent DL transmissions to the UE. Upon receiving the pre-compensated DL transmissions, the UE may determine that it may reduce or eliminate its own filtering operations, which reduces the UE's power consumption, especially for very high bandwidth operation, compared to conventional approaches.

Figure 7:
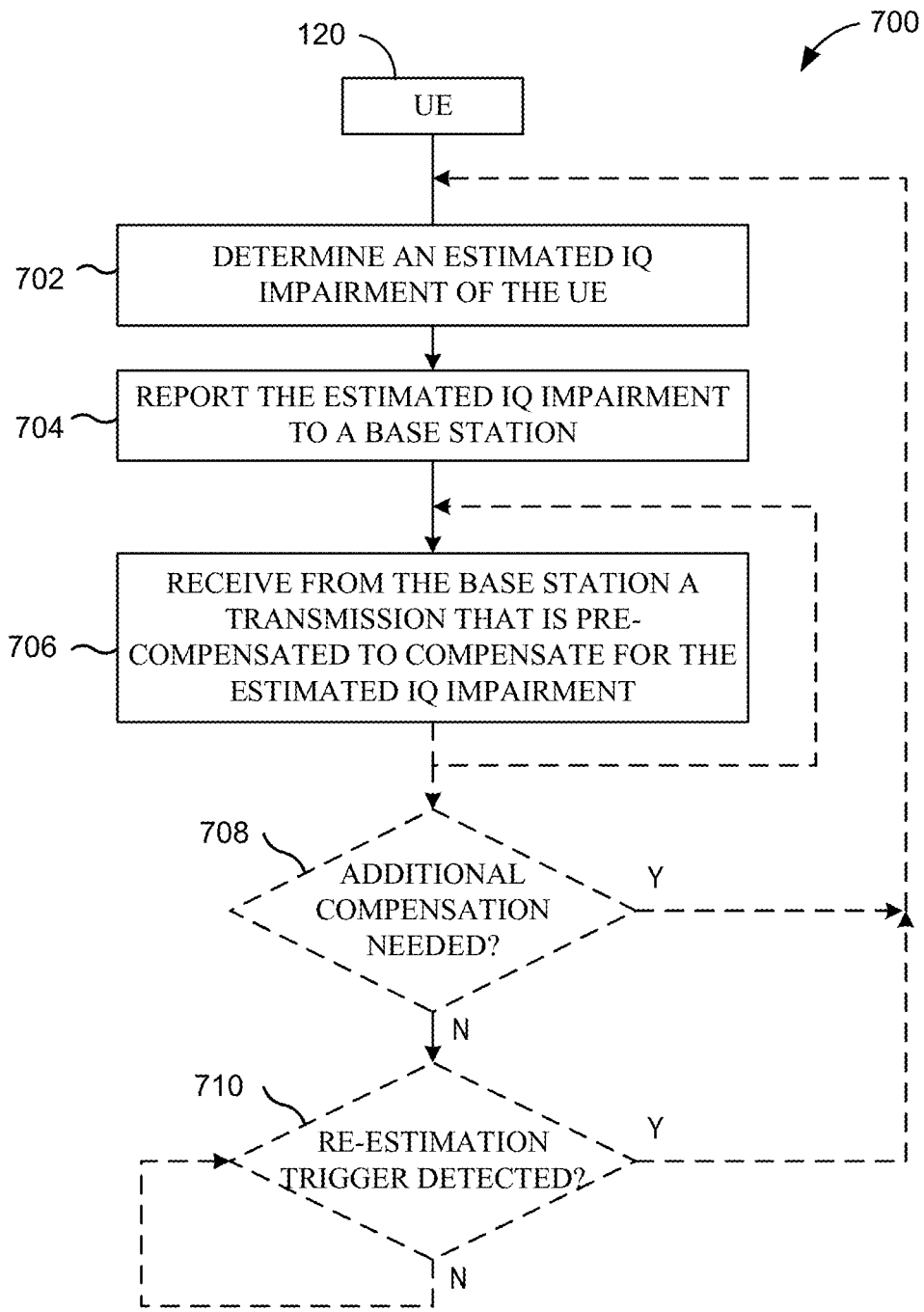
FIG. 7 is a flow chart illustrating an exemplary method of operating a UE according to some aspects of the disclosure.

FIG. 7 is a flow chart illustrating an exemplary method 700 of operating a UE 120 according to some aspects of the disclosure. As shown in FIG. 7, the method 700 may start at block 702 with determining an estimated IQ impairment of the UE 120. According to some aspects, IQ impairments are mismatches between the I and Q paths within analog receiver circuitry of the UE 120, such as phase mismatches, amplitude mismatches, or both phase and amplitude mismatches between the two paths.

According to some aspects, since the phase and/or amplitude mismatches between the I and Q paths may be frequency-dependent, the IQ impairment of the UE may be estimated at a specified frequency within the range of frequencies (i.e., the bandwidth) supported by the UE 120, such as the center frequency of the bandwidth supported by the UE 120. Alternatively, the IQ impairment of the UE may be estimated for each of one or more bandwidth parts of the bandwidth supported by the UE 120. For example, the IQ impairment of the UE may be estimated for one bandwidth part that is all or just a subset of the entire bandwidth supported by the UE 120, or the IQ impairment of the UE may be estimated for two or more bandwidth parts, each bandwidth part incorporating a different subset of the bandwidth supported by the UE 120. Likewise, the IQ impairment of the UE for each bandwidth part may be the average IQ impairment over the frequency range of the bandwidth part, or it may be the IQ impairment of the UE measured at a specific frequency within the bandwidth part.

The method 700 may continue at block 704 with reporting the estimated IQ impairment to a BS 110. According to some aspects, an estimated IQ impairment may be represented by a pair of complex (e.g., real and imaginary) numbers, or by any other means by which to indicate amplitude mismatch and/or phase mismatch of the I and Q paths.

According to some aspects, the UE 120 sends a single set that describes the amplitude error and/or phase error for the entire frequency range supported by the UE 120. For example, the UE 120 may report the average amplitude error or phase error across the entire frequency range supported by the UE 120.

In another aspect, the UE 120 may report amplitude error and/or phase error for one or more sets of frequency ranges (which may also be referred to as bandwidth parts (BWPs)), each frequency range representing a subset of the entire frequency range supported by the UE 120. According to some aspects, the UE 120 may include with each estimated IQ impairment an indicator identifying the bandwidth part and/or frequency with which the estimated IQ impairment is associated.

For example, Table 1, below, lists measured values of amplitude error and phase error for a hypothetical UE 120 having a supported frequency range $FR_0$ that includes five non-overlapping frequency ranges $FR_1$, $FR_2$, $FR_3$, $FR_4$, and $FR_5$.

TABLE 1

| Frequency Range | Amplitude Error | Phase Error |
|---|---|---|
| $FR_1$ | 0.10 | 0.25 |
| $FR_2$ | 0.15 | 0.30 |
| $FR_3$ | 0.23 | 0.37 |
| $FR_4$ | 0.17 | 0.49 |
| $FR_5$ | 0.11 | 0.65 |

Table 2, below, shows example sets of values that the UE 120 may report to the BS 110 according to some aspects in which the UE 120 reports amplitude and phase error for each frequency range separately.

TABLE 2

| Set | Value |
|---|---|
| 1 | {$FR_1$, 0.10, 0.25} |
| 2 | {$FR_2$, 0.15, 0.30} |
| 3 | {$FR_3$, 0.23, 0.37} |
| 4 | {$FR_4$, 0.17, 0.59} |
| 5 | {$FR_5$, 0.11, 0.65} |

Table 3, below, shows examples sets of values that the UE 120 may report to the BS 110 according to other aspects in which the UE 120 reports to the BS 110 a common amplitude error value and a common phase error value, along with frequency-range-specific differences from the common amplitude and phase error values.

TABLE 3

| Set | Value |
|---|---|
| 1 | {$FR_0$, 0.15, 0.43} |
| 2 | {$FR_1$, −0.5, −0.18} |
| 3 | {$FR_2$, 0.00, −0.13} |
| 4 | {$FR_3$, 0.8, −0.6} |
| 5 | {$FR_4$, 0.02, 0.16} |
| 6 | {$FR_5$, −0.4, 0.22} |

In some aspects, the common error values are frequency-independent while the other error values are frequency-dependent. In the example shown in Table 3, above, set 1 describes a common amplitude error value and a common error value, which in this example are the average amplitude and phase error values over entire supported frequency range $FR_0$, but which could instead be the lowest or highest error values, or a baseline number determined via another way. Sets 2 through 6 are offsets from the common error values: to determine the amplitude and phase error values for a particular bandwidth part, such as $FR_3$, the offset values for $FR_3$ (0.8 and −0.6) are added to the common value for $FR_0$ (0.15 and 0.43) to arrive at an amplitude and phase error of (0.23 and 0.37), which are the same values contained in set 3 of Table 2.

According to some aspects, reporting the estimated IQ impairment of the UE 120 to the BS 110 includes providing a description of a filter configuration to be used by the BS 110. Providing a filter configuration may include providing a description of the filter architecture, number of taps, filter coefficients, etc.

According to some aspects, the determining step and the reporting step are performed in response to detecting a trigger condition. Examples of trigger conditions include, but are not limited to, detecting a change in a network condition, detecting a change in an operating condition of the UE 120, and receiving an instruction from a network entity to perform the determining and reporting steps.

According to some aspects, detecting a change in a network condition may include, but is not limited to, determining that a bit error rate (BER), a mean square error (MSE), a signal to noise ratio (SNR), a signal and interference to noise ratio (SINR), a total harmonic distortion (THD), an error vector magnitude (EVM), some other signal or channel metric, or some combination or mathematical operation of the above, satisfies a threshold value, which can happen as a mobile device changes location and quality of service changes as a result, for example. For example, detection of a change in network condition may include, but is not limited to, detection that an EVM value (e.g., the MSE of an OFDM constellation) has crossed a threshold, or detection that a value of (EVM-SNR) has crossed a threshold.

According to some aspects, detecting a change in an operating condition of the UE 120 may include, but is not limited to, determining that a power supply condition, a temperature, or a performance metric of the UE 120 satisfies a threshold value. For example, if the UE's battery voltage drops, the performance of the analog receiver may be adversely affected, causing it to be more susceptible to IQ impairment and thus requiring additional compensation by the BS 110.

According to some aspects, the determining and reporting steps are repeated periodically. For example, a UE 120 may receive a periodic request from the BS 110 to perform the IQ impairment of the UE estimation and report the results to the BS 110. Alternatively, the UE 120 may decide (or be instructed by the BS 110) to periodically perform the IQ impairment of the UE estimation and report the results to the BS 110, e.g., by using an internal timer for that purpose.

The method 700 may continue at block 706 with receiving, from the BS 110, a transmission that is pre-compensated to compensate for the estimated IQ impairment. According to some aspects, the UE 120 may continue to receive pre-compensated transmissions from the BS 110. According to some aspects, the BS 110 will continue to pre-compensate the transmissions to the UE 120 based on the estimated IQ impairment last received from the UE 120.

According to some aspects, the method 700 may optionally continue at block 708, where the UE 120 determines whether additional compensation is needed, and if so, the process restarts at block 702 and continues until it reaches block 708, looping until additional compensation is not needed. According to some aspects, the UE 120 determines that additional compensation is needed based on a measured value of residual IQ impairment from the pre-compensated transmission received from the BS 110, based on a channel characteristic, such as BER, MSE, SNR, SINR, THD etc., based on some other metric, or based on some combination of the above.

According to some aspects, the method 700 may optionally continue at block 710, where the UE detects a re-estimation trigger, in which case the process restarts at block 702 and continues until it reaches block 710. Examples of re-estimation triggers include, but are not limited to, a expiry of a timer, detection that a signal or channel characteristic has satisfied a predefined threshold, detection that an operating condition of the UE 120 has changed, receipt of a request for re-estimation from an application or entity within the UE, and receipt of a request for re-estimation from an application or entity outside the UE, such as, but not limited to, from the base station or other network node. For example, since IQ impairments may vary with time, the re-estimation may be performed periodically. Likewise, the re-estimation may be performed in response to detection of an indication that re-estimation would be beneficial or necessary.

According to some aspects, a UE 120 may dynamically adjust a receiver digital filter configuration in response to changes in the estimated IQ impairment. For example, before the UE 120 has reported an estimated IQ impairment to the BS 110, the UE 120 may use a conventional receiver digital filter configuration having many taps, because in conventional systems, the UE 120 performs the compensation. After the UE 120 has reported an estimated IQ impairment to the BS 110, however, the BS 110 may begin pre-compensating the transmit signal to the UE 120. Because the data transmissions from the BS 110 are pre-compensated for the reported IQ impairment, the constellation points will be closer to their ideal locations, meaning that the receiver digital filter can be reconfigured with fewer taps, or even disabled, eliminated, or bypassed altogether, resulting in a significant power savings at the UE 120. According to some aspects, dynamically adjusting the number of filter taps used by the receiver digital filter may include decreasing the number of filter taps used by the receiver digital filter in response to a decrease in the estimated IQ impairment and increasing the number of filter taps used by the receiver digital filter in response to an increase in the estimated IQ impairment.

Figure 8:
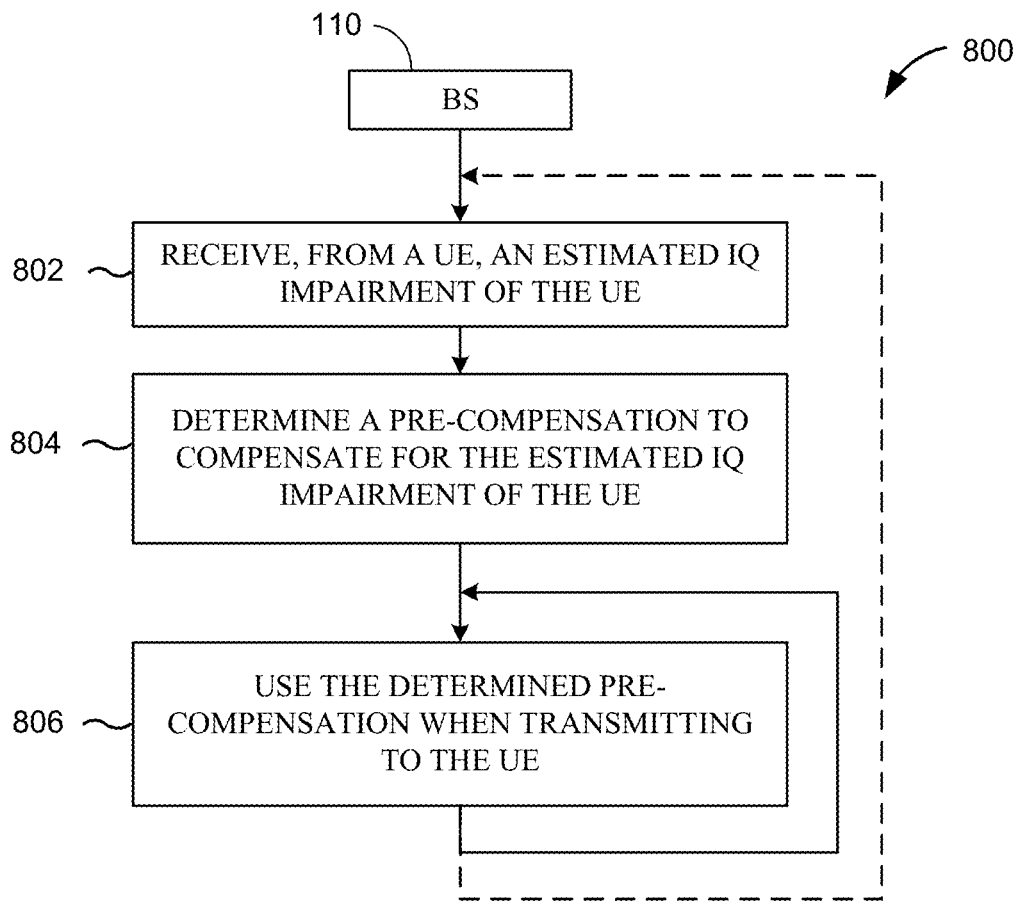
FIG. 8 is a flow chart illustrating an exemplary method of operating a base station according to some aspects of the disclosure.

FIG. 8 is a flow chart illustrating an exemplary method 800 of operating a BS 110 according to some aspects of the disclosure. As shown in FIG. 8, the method 800 may start at block 802 with receiving, from a UE 120, an estimated IQ impairment at the UE 120. The form and content of the received estimated IQ impairment may be the same as the form and content of the transmitted estimated IQ impairment described above with reference to FIG. 7 and will therefore not be repeated here.

The method 800 may continue at block 804 with determining a pre-compensation to compensate for the estimated IQ impairment of the UE 120. According to some aspects, determining a pre-compensation to compensate for the estimated IQ impairment of the UE comprises determining a pre-compensation to compensate for the mismatch of phase and/or amplitude, between an I path and a Q path within an analog receiver circuitry of the UE. Such pre-compensation would ideally eliminate any difference between the actual and ideal positions of the received constellation points, e.g., the actual constellation points shown in FIG. 4 and FIG. 5 would be located in their ideal positions, eliminating any doubt about what constellation point was received and thus eliminating the need for digital filtering to resolve those ambiguities with the attendant reduction in power consumption at the UE 120. Even a partial reduction in the distance between the actual and ideal positions of the received constellation points would allow the digital filtering on the UE 120 to be performed with a smaller filter, e.g., fewer taps and thus fewer processing steps for each iteration. This would also provide a reduction in power consumption at the UE 120.

The method 800 may continue at block 806 with using the determined pre-compensation when transmitting to the UE 120. According to some aspects, the BS 110 will continue to pre-compensate the transmissions to the UE 120 based on the estimated IQ impairment last received from the UE 120. According to some aspects, the BS 110 may optionally receive another estimated IQ impairment from the UE 120, in which case the method 800 restarts at block 802 and continues until it reaches block 806. According to some aspects, the BS 110 will continue to pre-compensate the transmissions to the UE 120 based on the estimated IQ impairment last received from the UE 120 until the end of a predetermined duration. For example, the BS 110 may pre-compensate the transmissions to the UE 120 based on the estimated IQ impairment last received from the UE 120 until the expiry of a timer configured to periodically trigger performing the determining and reporting steps, after which the BS 110 may stop pre-compensating the transmissions to the UE 120. According to some aspects, the BS 110 uses the estimated IQ impairment last received from the UE 120 until receiving an instruction from the UE 120 to stop pre-compensating or a notification from the UE 120 that the estimated IQ impairment last received from the UE 120 is no longer valid.

The techniques disclosed herein provide a number of the technical advantages over the prior art. By moving the burden of compensation for a UE's IQ impairments from the battery-powered UE 120 onto the more powerful BS 110, the UE 120 may be relieved of a significant processing burden, which not only reduces the power consumption of a UE 120 and increases it battery life, but also makes it possible for the UE 120 to operate at very high bandwidths—something that, because of the power required by the conventional digital filtering approach, which increases proportionally with bandwidth, the UE 120 might not be able to do, especially in sub-THz communication, which can use a very high bandwidth system. Moreover, by moving the digital filtering operation from the UE 120 onto the BS 110, the hardware or software complexity of the UE 120 may be reduced, e.g., by eliminating software routines that conventional UEs used to perform the digital filtering function, by eliminating hardware or circuitry that was conventional UEs used to perform the digital filtering function, or both. Thus, the techniques disclosed herein provide the technical advantage that they enable the creation of a low power, low complexity receiver.

Moreover, by providing a mechanism by which the BS 110 can pre-compensate each UE 120 individually, the overall performance of the network is improved: the improved BER, for example, that results from more accurate constellation locations, may translate to fewer retransmissions required and less traffic overall. Single Carrier OFDM, for example, is very sensitive to IQ impairments: an IQ mismatch (skew) of only 1 sample can result in a complete inability to decode the received data even for low constellation configurations. Using the techniques disclosed herein can correct for such IQ mismatches, resulting in successful operation in SC-OFDM networks.

Figure 9:
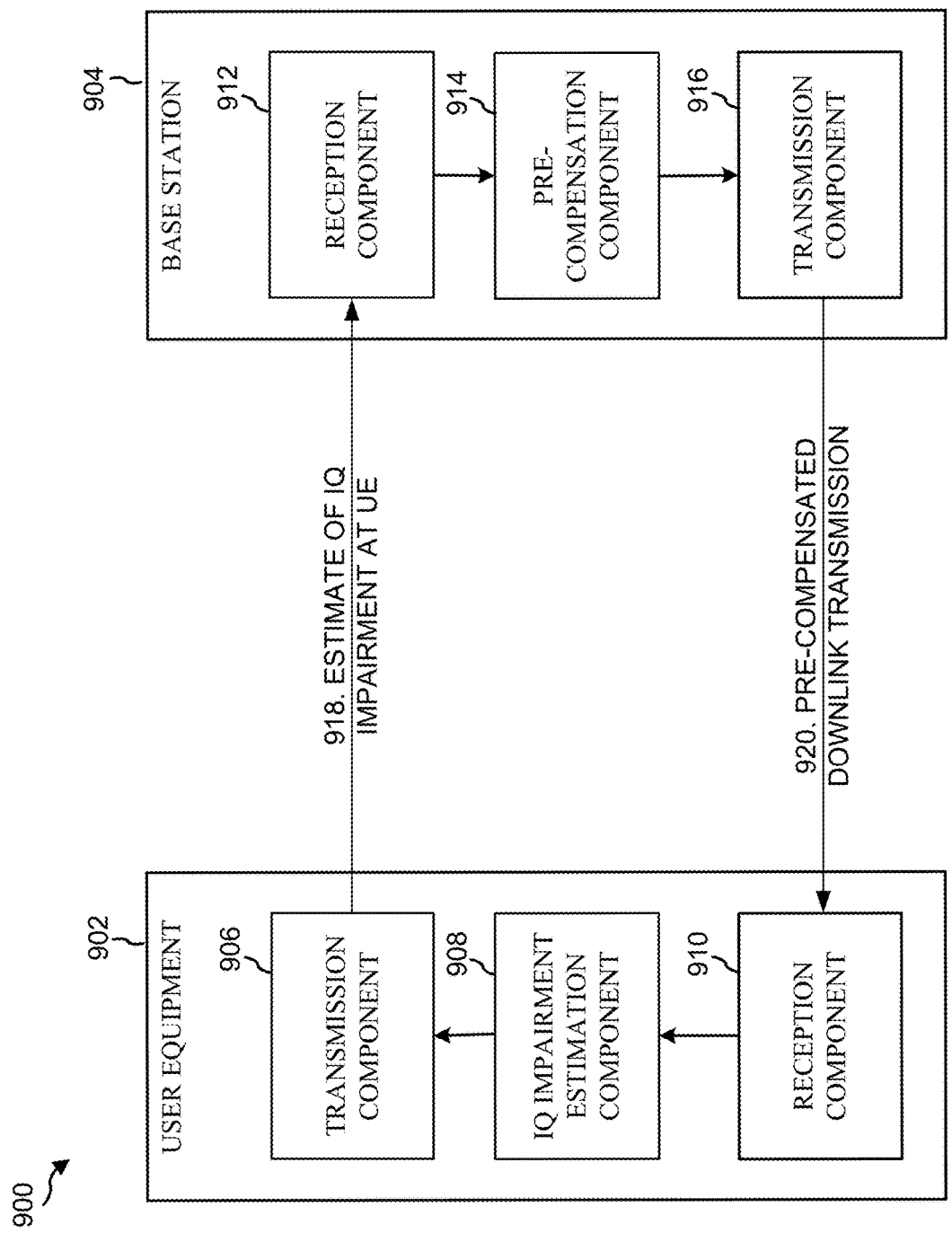
FIG. 9 is a conceptual data flow diagram illustrating the data flow between different means/components in exemplary apparatuses in accordance with some aspects of the disclosure.

FIG. 9 is a conceptual data flow diagram 900 illustrating the data flow between different means/components in exemplary apparatuses 902 and 904 in accordance some aspects of the disclosure. The apparatus 902 may be a UE (e.g., UE 120) in communication with an apparatus 904, which may be a base station (e.g., BS 110).

The apparatus 902 includes a transmission component 906, which may correspond to transmitter circuitry in UE 120 as depicted in FIG. 2, including controller/processor 280, antenna(s) 252a . . . 252r, modulators(s) 254a . . . 254r, TX MIMO processor 266, TX processor 264. The apparatus 902 further includes an IQ impairment estimation component 908, which may correspond to processor circuitry in UE 120 as depicted in FIG. 2, including controller/processor 280, etc. The apparatus 902 further includes a reception component 910, which may correspond to receiver circuitry in UE 120 as depicted in FIG. 2, including controller/processor 280, antenna(s) 252a . . . 252r, demodulators(s) 254a . . . 254r, MIMO detector 256, RX processor 258.

The apparatus 904 includes a reception component 912, which may correspond to receiver circuitry in BS 110 as depicted in FIG. 2, including controller/processor 240, antenna(s) 234a . . . 234r, demodulators(s) 232a . . . 232r, MIMO detector 236, RX processor 238, communication unit 244. The apparatus 904 further includes a pre-compensation component 914, which may correspond to processor circuitry in BS 110 as depicted in FIG. 2, including controller/processor 240. The apparatus 904 further includes a transmission component 916, which may correspond to transmission circuitry in BS 110 as depicted in FIG. 2, including e.g., controller/processor 240, antenna(s) 234a . . . 234r, modulators(s) 232a . . . 232r, Tx MIMO processor 230, TX processor 220, communication unit 244.

Referring to FIG. 9, at the apparatus 902, the IQ impairment of the UE estimation component 908 estimates an IQ impairment of the apparatus 902 and provides the estimated IQ impairment to the transmission component 906, which sends the estimated IQ impairment to the apparatus 904 (e.g., in uplink transmission 918). At the apparatus 904, the reception component 912 receives, from the apparatus 902, the estimated IQ impairment at the apparatus 902, and provides the estimated IQ impairment to the pre-compensation component 914. The pre-compensation component 914 determines a pre-compensation to compensate for the estimated IQ impairment at the apparatus 902, which it provides to the transmission component 916. The transmission component 916 then uses the pre-compensation when transmitting data to the apparatus 902 (e.g., during downlink transmission 920).

One or more components of the apparatus 902 and apparatus 904 may perform each of the blocks of the algorithm in the aforementioned flowcharts of FIGS. 7-8. As such, each block in the aforementioned flowcharts of FIGS. 7-8 may be performed by a component and the apparatus 902 and apparatus 904 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
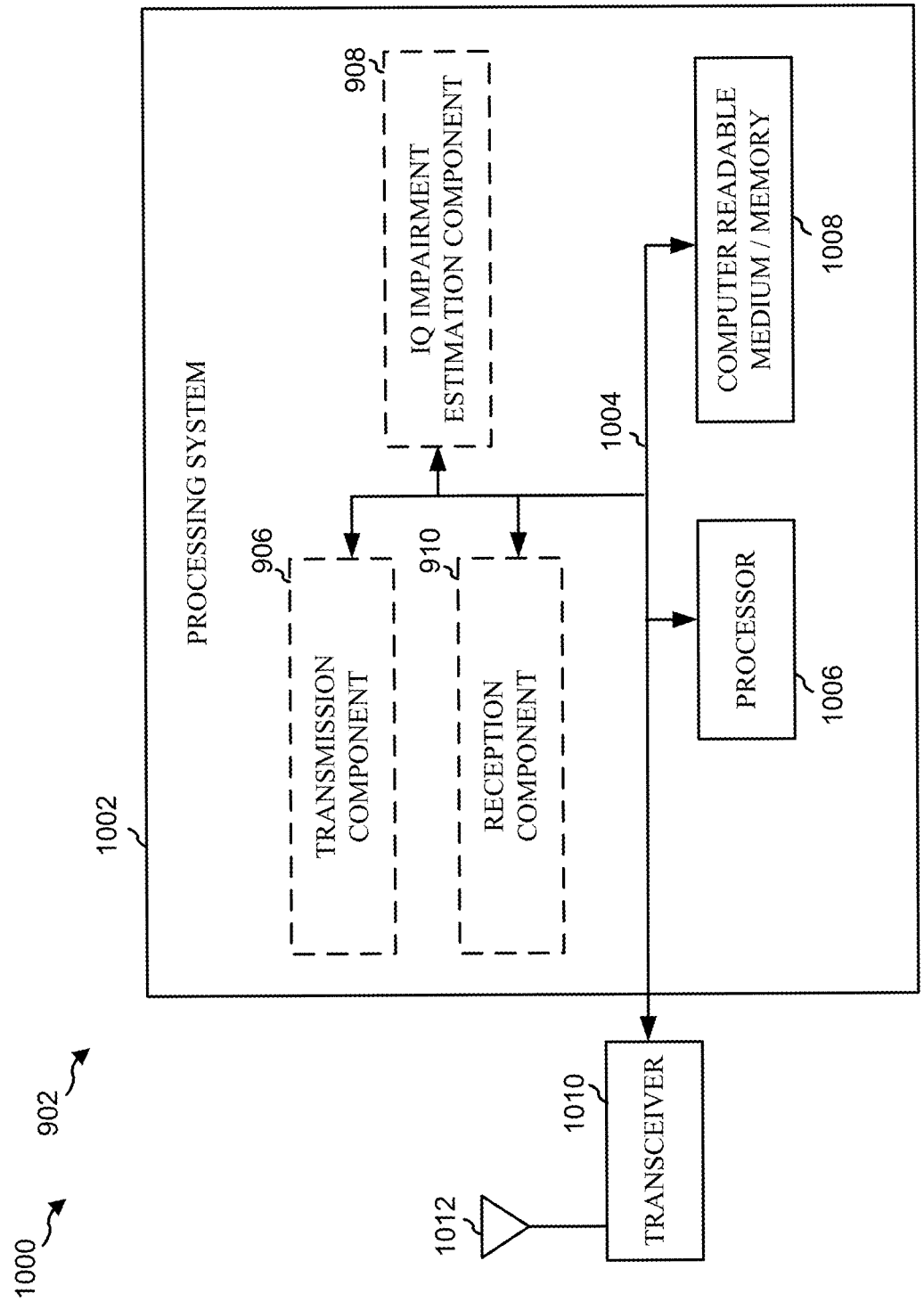
FIG. 10 is a diagram illustrating an example of a hardware implementation for an apparatus employing a processing system.

FIG. 10 is a diagram 1000 illustrating an example of a hardware implementation for an apparatus 902 employing a processing system 1002. The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware components, represented by the processor 1006, the transmission component 906, the IQ impairment estimation component 908, the reception component 910, and the computer-readable medium/memory 1008. The bus 1004 may also link various other circuits such as timing sources, peripherals, voltage regulators, and power management circuits, which are well known in the art, and therefore, will not be described any further.

The processing system 1002 may be coupled to a transceiver 1010. The transceiver 1010 is coupled to one or more antennas 1012. The transceiver 1010 provides a means for communicating with various other apparatus over a transmission medium. The transceiver 1010 receives a signal from the one or more antennas 1012, extracts information from the received signal, and provides the extracted information to the processing system 1002, specifically the reception component 910. In addition, the transceiver 1010 receives information from the processing system 1002, specifically the transmission component 906, and based on the received information, generates a signal to be applied to the one or more antennas 1012. The processing system 1002 includes a processor 1006 communicatively coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described supra for any particular apparatus. The computer-readable medium/memory 1008 may also be used for storing data that is manipulated by the processor 1006 when executing software. The processing system 1002 further includes at least one of the components 906, 908, and 910. The components may be software components running in the processor 1006, resident/stored in the computer-readable medium/memory 1008, one or more hardware components coupled to the processor 1006, or some combination thereof. The processing system 1002 may be a component of the UE 120 of FIG. 2 and may include the memory 282, and/or at least one of the TX processor 264, the RX processor 258, and the controller/processor 280.

In one configuration, the apparatus 902 (e.g., a UE) for wireless communication includes means for determining an estimated IQ impairment of the UE, the IQ impairment of the UE comprising a mismatch of phase and/or amplitude, between an I path and a Q path within an analog receiver circuitry of the UE, and means for reporting the estimated IQ impairment to a BS.

The aforementioned means may be one or more of the aforementioned components of the apparatus 902 and/or the processing system 1002 of the apparatus 902 configured to perform the functions recited by the aforementioned means. As described supra, the processing system 1002 may include the TX processor 264, the RX processor 258, and the controller/processor 280.

Figure 11:
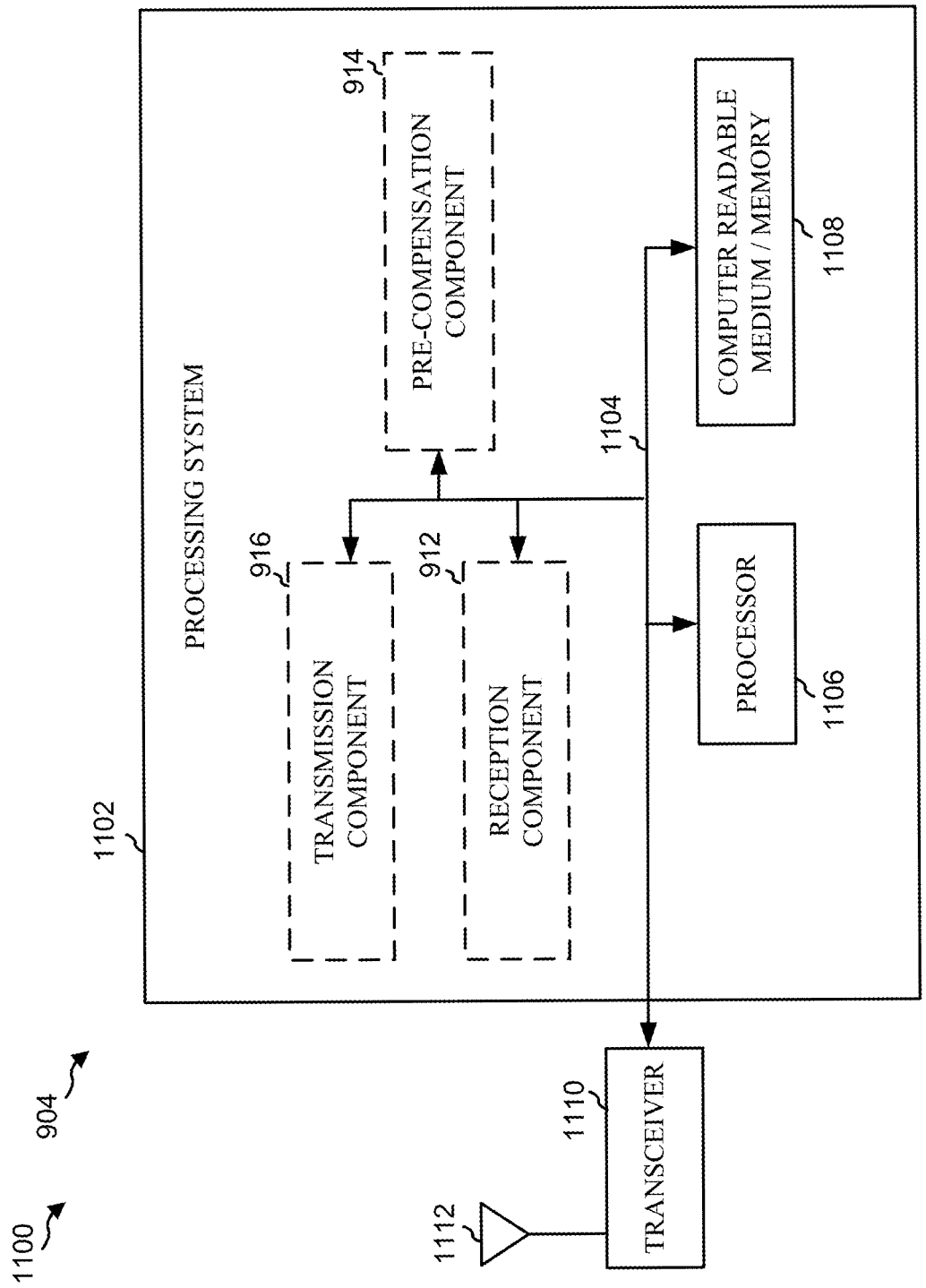
FIG. 11 is a diagram illustrating another example of a hardware implementation for an apparatus employing a processing system.

FIG. 11 is a diagram 1100 illustrating an example of a hardware implementation for an apparatus 904 employing a processing system 1102. The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware components, represented by the processor 1106, the reception component 912, the pre-compensation component 914, the transmission component 916, and the computer-readable medium/memory 1108. The bus 1104 may also link various other circuits such as timing sources, peripherals, voltage regulators, and power management circuits, which are well known in the art, and therefore, will not be described any further.

The processing system 1102 may be coupled to a transceiver 1110. The transceiver 1110 is coupled to one or more antennas 1112. The transceiver 1110 provides a means for communicating with various other apparatus over a transmission medium. The transceiver 1110 receives a signal from the one or more antennas 1112, extracts information from the received signal, and provides the extracted information to the processing system 1102, specifically the reception component 912. In addition, the transceiver 1110 receives information from the processing system 1102, specifically the transmission component 916, and based on the received information, generates a signal to be applied to the one or more antennas 1112. The processing system 1102 includes a processor 1106 communicatively coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described supra for any particular apparatus. The computer-readable medium/memory 1108 may also be used for storing data that is manipulated by the processor 1106 when executing software. The processing system 1102 further includes at least one of the components 912, 914, and 916. The components may be software components running in the processor 1106, resident/stored in the computer-readable medium/memory 1108, one or more hardware components coupled to the processor 1106, or some combination thereof. The processing system 1102 may be a component of the BS 110 of FIG. 2 and may include the memory 242, and/or at least one of the TX processor 220, the RX processor 238, and the controller/processor 240.

In one configuration, the apparatus 904 (e.g., a BS) for wireless communication includes means for receiving, from a UE, an estimated IQ impairment at the UE, the IQ impairment of the UE comprising a mismatch of phase and/or amplitude, between an I path and a Q path within an analog receiver circuitry of the UE, means for determining a pre-compensation to compensate for the estimated IQ impairment of the UE, and means for using the determined pre-compensation when transmitting to the UE.

The aforementioned means may be one or more of the aforementioned components of the apparatus 904 and/or the processing system 1102 of the apparatus 904 configured to perform the functions recited by the aforementioned means. As described supra, the processing system 1102 may include the TX processor 220, the RX processor 238, and the controller/processor 240.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), the method comprising:
determining an estimated in-phase (I) and quadrature phase (Q) impairment of the UE, the IQ impairment of the UE comprising a mismatch of phase and/or amplitude, between an I path and a Q path within an analog receiver circuitry of the UE; and reporting the estimated IQ impairment of the UE to a base station (BS).

Clause 2. The method of clause 1, wherein determining the estimated IQ impairment of the UE comprises determining an estimated IQ impairment at a specified frequency within a bandwidth supported by the UE.

Clause 3. The method of any of clauses 1 to 2, wherein determining the estimated IQ impairment of the UE comprises determining an estimated IQ impairment at each of a set of one or more bandwidth parts of a bandwidth supported by the UE and wherein reporting the estimated IQ impairment of the UE to the BS comprises reporting the estimated IQ impairment at each bandwidth part in the set of one or more bandwidth parts.

Clause 4. The method of any of clauses 1 to 3, wherein reporting the estimated IQ impairment of the UE to the BS comprises reporting the estimated IQ impairment as one or more sets of complex numbers.

Clause 5. The method of any of clauses 1 to 4, wherein reporting the estimated IQ impairment of the UE to the BS comprises reporting the estimated IQ impairment as an amplitude error and/or a phase error for an entire bandwidth supported by the UE.

Clause 6. The method of any of clauses 1 to 5, wherein reporting the estimated IQ impairment of the UE to the BS comprises reporting the estimated IQ impairment as one or more sets, each set describing an amplitude error and/or phase error of one or more bandwidth parts of a bandwidth supported by the UE.

Clause 7. The method of any of clauses 1 to 6, wherein reporting the estimated IQ impairment of the UE to the BS comprises reporting the estimated IQ impairment as a first set describing an amplitude error and/or phase error common to all of the one or more bandwidth parts and one or more second sets, each second set describing an amplitude error and/or phase error of each of one or more bandwidth parts of a bandwidth supported by the UE as an absolute value or as a difference from the amplitude error and/or phase error described in the first set.

Clause 8. The method of any of clauses 1 to 7, wherein reporting the estimated IQ impairment of the UE to the BS comprises reporting the estimated IQ impairment as a first set describing a frequency-independent amplitude error and/or phase error and a second set describing a frequency-dependent amplitude error and/or phase error.

Clause 9. The method of any of clauses 1 to 8, wherein reporting the estimated IQ impairment of the UE to the BS comprises providing a description of a filter configuration to be used by the BS, the filter description comprising a description of a filter architecture, a number of taps, one or more filter coefficients, or a combination thereof.

Clause 10. The method of any of clauses 1 to 9, wherein the determining and reporting steps are repeated periodically.

Clause 11. The method of any of clauses 1 to 10, wherein the determining and reporting steps are performed in response to detecting a trigger condition.

Clause 12. The method of clause 11, wherein the detecting the trigger condition comprises detecting a change in a network condition, detecting a change in an operating condition of the UE, receiving an instruction from a network entity to perform the determining and reporting steps, detecting an expiry of a timer configured to periodically trigger performing the determining and reporting steps.

Clause 13. The method of any of clauses 1 to 12, further comprising: receiving a transmission from the BS, the transmission being pre-compensated to compensate for the estimated IQ impairment of the UE.

Clause 14. The method of clause 13, further comprising: repeating the determining, reporting, and receiving steps until determining that at least one of an IQ impairment, a bit error rate (BER), a mean square error (MSE), a signal to noise ratio (SNR), a signal and interference to noise ratio (SINR), a total harmonic distortion (THD), or an error vector magnitude (EVM) satisfies a threshold value.

Clause 15. The method of any of clauses 13 to 14, further comprising: dynamically adjusting a configuration of a receiver digital filter in response to changes in the estimated IQ impairment of the UE.

Clause 16. The method of clause 15, wherein dynamically adjusting the configuration of the receiver digital filter in response to changes in the estimated IQ impairment of the UE comprises: decreasing the number of filter taps used by the receiver digital filter in response to a decrease in estimated IQ impairment of the UE; increasing the number of filter taps used by the receiver digital filter in response to an increase in estimated IQ impairment of the UE; or disabling, eliminating, or bypassing the receiver digital filter.

Clause 17. A method of operating a base station (BS), the method comprising: receiving, from a user equipment (UE), an estimated in-phase (I) and quadrature phase (Q) impairment at the UE, the IQ impairment of the UE comprising a mismatch of phase and/or amplitude, between an I path and a Q path within the analog receiver circuitry of the UE; determining a pre-compensation to compensate for the estimated IQ impairment of the UE; and using the determined pre-compensation when transmitting to the UE.

Clause 18. The method of clause 17, wherein receiving the estimated IQ impairment of the UE comprises receiving an estimated IQ impairment at a specified frequency within a bandwidth supported by the UE.

Clause 19. The method of any of clauses 17 to 18, wherein receiving the estimated IQ impairment of the UE comprises receiving an estimated IQ impairment at each of a set of one or more bandwidth parts of a bandwidth supported by the UE.

Clause 20. The method of clause 19, wherein the set of bandwidth parts comprises one bandwidth part incorporating all or part of the bandwidth supported by the UE, or two or more bandwidth parts, each bandwidth part incorporating a different subset of the bandwidth supported by the UE.

Clause 21. The method of any of clauses 17 to 20, wherein receiving the estimated IQ impairment of the UE to the BS comprises receiving the estimated IQ impairment of the UE as one or more sets of complex numbers.

Clause 22. The method of any of clauses 17 to 21, wherein reporting the estimated IQ impairment of the UE to the BS comprises reporting the estimated IQ impairment as an amplitude error and/or a phase error for an entire bandwidth supported by the UE.

Clause 23. The method of any of clauses 17 to 22, wherein reporting the estimated IQ impairment of the UE to the BS comprises reporting the estimated IQ impairment as one or more sets, each set describing an amplitude error and/or phase error of one or more bandwidth parts of a bandwidth supported by the UE.

Clause 24. The method of any of clauses 17 to 23, wherein reporting the estimated IQ impairment of the UE to the BS comprises reporting the estimated IQ impairment as a first set describing an amplitude error and/or phase error common to all of the one or more bandwidth parts and one or more second sets, each second set describing an amplitude error and/or phase error of each of one or more bandwidth parts of a bandwidth supported by the UE, as an absolute error or as a difference from the amplitude error and/or phase error described in the first set.

Clause 25. The method of any of clauses 17 to 24, wherein reporting the estimated IQ impairment of the UE to the BS comprises reporting the estimated IQ impairment as a first set describing a frequency-independent amplitude error and/or phase error and a second set describing a frequency-dependent amplitude error and/or phase error.

Clause 26. The method of any of clauses 17 to 25, wherein determining the pre-compensation to compensate for the estimated IQ impairment of the UE comprises determining a pre-compensation to compensate for the mismatch of phase and/or amplitude, between an I path and a Q path within the analog receiver circuitry of the UE.

Clause 27. The method of any of clauses 17 to 26, further comprising continuing to use the determined pre-compensation when transmitting to the UE based on the estimated IQ impairment of the UE last received from the UE.

Clause 28. The method of any of clauses 17 to 27, wherein the BS uses the estimated IQ impairment last received from the UE until the BS receives another estimated IQ impairment from the UE, until the end of a predetermined duration, until receiving an instruction from the UE to stop pre-compensating, until receiving a notification from the UE that the estimated IQ impairment last received from the UE is no longer valid, or a combination thereof.

Clause 29. A user equipment (UE), comprising: a memory; at least one transceiver; and at least one processor communicatively coupled to the memory and the at least one transceiver, the at least one processor configured to: determine an estimated in-phase (I) and quadrature phase (Q) impairment of the UE, the IQ impairment of the UE comprising a mismatch of phase and/or amplitude, between an I path and a Q path within an analog receiver circuitry of the UE; and report the estimated IQ impairment of the UE to a base station (BS).

Clause 30. The UE of clause 29, wherein, to determine the estimated IQ impairment of the UE, the at least one processor is configured to determine an estimated IQ impairment at a specified frequency within a bandwidth supported by the UE.

Clause 31. The UE of any of clauses 29 to 30, wherein determining the estimated IQ impairment of the UE comprises determining an estimated IQ impairment at each of a set of one or more bandwidth parts of a bandwidth supported by the UE and wherein reporting the estimated IQ impairment of the UE to the BS comprises reporting the estimated IQ impairment at each bandwidth part in the set of one or more bandwidth parts.

Clause 32. The UE of any of clauses 29 to 31, wherein, to report the estimated IQ impairment of the UE to the BS, the at least one processor is configured to report the estimated IQ impairment as one or more sets of complex numbers.

Clause 33. The UE of any of clauses 29 to 32, wherein, to report the estimated IQ impairment of the UE to the BS, the at least one processor is configured to report the estimated IQ impairment as an amplitude error and/or a phase error for an entire bandwidth supported by the UE.

Clause 34. The UE of any of clauses 29 to 33, wherein, to report the estimated IQ impairment of the UE to the BS, the at least one processor is configured to report the estimated IQ impairment as one or more sets, each set describing an amplitude error and/or phase error of one or more bandwidth parts of a bandwidth supported by the UE.

Clause 35. The UE of any of clauses 29 to 34, wherein, to report the estimated IQ impairment of the UE to the BS, the at least one processor is configured to report the estimated IQ impairment as a first set describing an amplitude error and/or phase error common to all of the one or more bandwidth parts and one or more second sets, each second set describing an amplitude error and/or phase error of each of one or more bandwidth parts of a bandwidth supported by the UE as an absolute value or as a difference from the amplitude error and/or phase error described in the first set.

Clause 36. The UE of any of clauses 29 to 35, wherein, to report the estimated IQ impairment of the UE to the BS, the at least one processor is configured to report the estimated IQ impairment as a first set describing a frequency-independent amplitude error and/or phase error and a second set describing a frequency-dependent amplitude error and/or phase error.

Clause 37. The UE of any of clauses 29 to 36, wherein, to report the estimated IQ impairment of the UE to the BS, the at least one processor is configured to provide a description of a filter configuration to be used by the BS, the filter description comprising a description of a filter architecture, a number of taps, one or more filter coefficients, or a combination thereof.

Clause 38. The UE of any of clauses 29 to 37, wherein the determining and reporting steps are repeated periodically.

Clause 39. The UE of any of clauses 29 to 38, wherein the determining and reporting steps are performed in response to detecting a trigger condition.

Clause 40. The UE of clause 39, wherein the detecting the trigger condition comprises detecting a change in a network condition, detecting a change in an operating condition of the UE, receiving an instruction from a network entity to perform the determining and reporting steps, detecting an expiry of a timer configured to periodically trigger performing the determining and reporting steps.

Clause 41. The UE of any of clauses 29 to 40, wherein the at least one processor is further configured to: receive, via the at least one transceiver, a transmission from the BS, the transmission being pre-compensated to compensate for the estimated IQ impairment of the UE.

Clause 42. The UE of clause 41, wherein the at least one processor is further configured to: repeat the determining, reporting, and receiving steps until determining that at least one of an IQ impairment, a bit error rate (BER), a mean square error (MSE), a signal to noise ratio (SNR), a signal and interference to noise ratio (SINR), a total harmonic distortion (THD), or an error vector magnitude (EVM) satisfies a threshold value.

Clause 43. The UE of any of clauses 41 to 42, wherein the at least one processor is further configured to: dynamically adjust a configuration of a receiver digital filter in response to changes in the estimated IQ impairment of the UE.

Clause 44. The UE of clause 43, wherein, to dynamically adjust the configuration of the receiver digital filter in response to changes in the estimated IQ impairment of the UE, the at least one processor is configured to: decrease the number of filter taps used by the receiver digital filter in response to a decrease in estimated IQ impairment of the UE; increase the number of filter taps used by the receiver digital filter in response to an increase in estimated IQ impairment of the UE; or disable, eliminating, or bypassing the receiver digital filter.

Clause 45. A BS, comprising: a memory; at least one transceiver; and at least one processor communicatively coupled to the memory and the at least one transceiver, the at least one processor configured to: receive, via the at least one transceiver, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE; determine a pre-compensation to compensate for the estimated IQ impairment of the UE; and use the determined pre-compensation when transmitting to the UE.

Clause 46. The BS of clause 45, wherein, to receive the estimated IQ impairment of the UE, the at least one processor is configured to receive an estimated IQ impairment at a specified frequency within a bandwidth supported by the UE.

Clause 47. The BS of any of clauses 45 to 46, wherein, to receive the estimated IQ impairment of the UE, the at least one processor is configured to receive an estimated IQ impairment at each of a set of one or more bandwidth parts of a bandwidth supported by the UE.

Clause 48. The BS of clause 47, wherein the set of bandwidth parts comprises one bandwidth part incorporating all or part of the bandwidth supported by the UE, or two or more bandwidth parts, each bandwidth part incorporating a different subset of the bandwidth supported by the UE.

Clause 49. The BS of any of clauses 45 to 48, wherein, to receive the estimated IQ impairment of the UE to the BS, the at least one processor is configured to receive the estimated IQ impairment of the UE as one or more sets of complex numbers.

Clause 50. The BS of any of clauses 45 to 49, wherein, to report the estimated IQ impairment of the UE to the BS, the at least one processor is configured to report the estimated IQ impairment as an amplitude error and/or a phase error for an entire bandwidth supported by the UE.

Clause 51. The BS of any of clauses 45 to 50, wherein, to report the estimated IQ impairment of the UE to the BS, the at least one processor is configured to report the estimated IQ impairment as one or more sets, each set describing an amplitude error and/or phase error of one or more bandwidth parts of a bandwidth supported by the UE.

Clause 52. The BS of any of clauses 45 to 51, wherein, to report the estimated IQ impairment of the UE to the BS, the at least one processor is configured to report the estimated IQ impairment as a first set describing an amplitude error and/or phase error common to all of the one or more bandwidth parts and one or more second sets, each second set describing an amplitude error and/or phase error of each of one or more bandwidth parts of a bandwidth supported by the UE, as an absolute error or as a difference from the amplitude error and/or phase error described in the first set.

Clause 53. The BS of any of clauses 45 to 52, wherein, to report the estimated IQ impairment of the UE to the BS, the at least one processor is configured to report the estimated IQ impairment as a first set describing a frequency-independent amplitude error and/or phase error and a second set describing a frequency-dependent amplitude error and/or phase error.

Clause 54. The BS of any of clauses 45 to 53, wherein, to determine the pre-compensation to compensate for the estimated IQ impairment of the UE, the at least one processor is configured to determine a pre-compensation to compensate for the mismatch of phase and/or amplitude, between an I path and a Q path within the analog receiver circuitry of the UE.

Clause 55. The BS of any of clauses 45 to 54, wherein the at least one processor is further configured to continue to use the determined pre-compensation when transmitting to the UE based on the estimated IQ impairment of the UE last received from the UE.

Clause 56. A user equipment (UE), comprising: means for determining an estimated in-phase (I) and quadrature phase (Q) impairment of the UE, the IQ impairment of the UE comprising a mismatch of phase and/or amplitude, between an I path and a Q path within an analog receiver circuitry of the UE; and means for reporting the estimated IQ impairment of the UE to a base station (BS).

Clause 57. The UE of clause 56, wherein the means for determining the estimated IQ impairment of the UE comprises means for determining an estimated IQ impairment at a specified frequency within a bandwidth supported by the UE.

Clause 58. The UE of any of clauses 56 to 57, wherein the means for determining the estimated IQ impairment of the UE comprises means for determining an estimated IQ impairment at each of a set of one or more bandwidth parts of a bandwidth supported by the UE and wherein reporting the estimated IQ impairment of the UE to the BS comprises reporting the estimated IQ impairment at each bandwidth part in the set of one or more bandwidth parts.

Clause 59. The UE of any of clauses 56 to 58, wherein the means for reporting the estimated IQ impairment of the UE to the BS comprises means for reporting the estimated IQ impairment as one or more sets of complex numbers.

Clause 60. The UE of any of clauses 56 to 59, wherein the means for reporting the estimated IQ impairment of the UE to the BS comprises means for reporting the estimated IQ impairment as an amplitude error and/or a phase error for an entire bandwidth supported by the UE.

Clause 61. The UE of any of clauses 56 to 60, wherein the means for reporting the estimated IQ impairment of the UE to the BS comprises means for reporting the estimated IQ impairment as one or more sets, each set describing an amplitude error and/or phase error of one or more bandwidth parts of a bandwidth supported by the UE.

Clause 62. The UE of any of clauses 56 to 61, wherein the means for reporting the estimated IQ impairment of the UE to the BS comprises means for reporting the estimated IQ impairment as a first set describing an amplitude error and/or phase error common to all of the one or more bandwidth parts and one or more second sets, each second set describing an amplitude error and/or phase error of each of one or more bandwidth parts of a bandwidth supported by the UE as an absolute value or as a difference from the amplitude error and/or phase error described in the first set.

Clause 63. The UE of any of clauses 56 to 62, wherein the means for reporting the estimated IQ impairment of the UE to the BS comprises means for reporting the estimated IQ impairment as a first set describing a frequency-independent amplitude error and/or phase error and a second set describing a frequency-dependent amplitude error and/or phase error.

Clause 64. The UE of any of clauses 56 to 63, wherein the means for reporting the estimated IQ impairment of the UE to the BS comprises means for providing a description of a filter configuration to be used by the BS, the filter description comprising a description of a filter architecture, a number of taps, one or more filter coefficients, or a combination thereof.

Clause 65. The UE of any of clauses 56 to 64, wherein the determining and reporting steps are repeated periodically.

Clause 66. The UE of any of clauses 56 to 65, wherein the determining and reporting steps are performed in response to detecting a trigger condition.

Clause 67. The UE of clause 66, wherein detecting the trigger condition comprises detecting a change in a network condition, detecting a change in an operating condition of the UE, receiving an instruction from a network entity to perform the determining and reporting steps, detecting an expiry of a timer configured to periodically trigger performing the determining and reporting steps.

Clause 68. The UE of any of clauses 56 to 67, further comprising: means for receiving a transmission from the BS, the transmission being pre-compensated to compensate for the estimated IQ impairment of the UE.

Clause 69. The UE of clause 68, further comprising: means for repeating the determining, reporting, and receiving steps until determining that at least one of an IQ impairment, a bit error rate (BER), a mean square error (MSE), a signal to noise ratio (SNR), a signal and interference to noise ratio (SINR), a total harmonic distortion (THD), or an error vector magnitude (EVM) satisfies a threshold value.

Clause 70. The UE of any of clauses 68 to 69, further comprising: means for dynamically adjusting a configuration of a receiver digital filter in response to changes in the estimated IQ impairment of the UE.

Clause 71. The UE of clause 70, wherein the means for dynamically adjusting the configuration of the receiver digital filter in response to changes in the estimated IQ impairment of the UE comprises: means for decreasing the number of filter taps used by the receiver digital filter in response to a decrease in estimated IQ impairment of the UE; means for increasing the number of filter taps used by the receiver digital filter in response to an increase in estimated IQ impairment of the UE; or means for disabling, eliminating, or bypassing the receiver digital filter.

Clause 72. A BS, comprising: means for receiving, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE; means for determining a pre-compensation to compensate for the estimated IQ impairment of the UE; and means for using the determined pre-compensation when transmitting to the UE.

Clause 73. The BS of clause 72, wherein the means for receiving the estimated IQ impairment of the UE comprises means for receiving an estimated IQ impairment at a specified frequency within a bandwidth supported by the UE.

Clause 74. The BS of any of clauses 72 to 73, wherein the means for receiving the estimated IQ impairment of the UE comprises means for receiving an estimated IQ impairment at each of a set of one or more bandwidth parts of a bandwidth supported by the UE.

Clause 75. The BS of clause 74, wherein the set of bandwidth parts comprises one bandwidth part incorporating all or part of the bandwidth supported by the UE, or two or more bandwidth parts, each bandwidth part incorporating a different subset of the bandwidth supported by the UE.

Clause 76. The BS of any of clauses 72 to 75, wherein the means for receiving the estimated IQ impairment of the UE to the BS comprises means for receiving the estimated IQ impairment of the UE as one or more sets of complex numbers.

Clause 77. The BS of any of clauses 72 to 76, wherein the means for reporting the estimated IQ impairment of the UE to the BS comprises means for reporting the estimated IQ impairment as an amplitude error and/or a phase error for an entire bandwidth supported by the UE.

Clause 78. The BS of any of clauses 72 to 77, wherein the means for reporting the estimated IQ impairment of the UE to the BS comprises means for reporting the estimated IQ impairment as one or more sets, each set describing an amplitude error and/or phase error of one or more bandwidth parts of a bandwidth supported by the UE.

Clause 79. The BS of any of clauses 72 to 78, wherein the means for reporting the estimated IQ impairment of the UE to the BS comprises means for reporting the estimated IQ impairment as a first set describing an amplitude error and/or phase error common to all of the one or more bandwidth parts and one or more second sets, each second set describing an amplitude error and/or phase error of each of one or more bandwidth parts of a bandwidth supported by the UE, as an absolute error or as a difference from the amplitude error and/or phase error described in the first set.

Clause 80. The BS of any of clauses 72 to 79, wherein the means for reporting the estimated IQ impairment of the UE to the BS comprises means for reporting the estimated IQ impairment as a first set describing a frequency-independent amplitude error and/or phase error and a second set describing a frequency-dependent amplitude error and/or phase error.

Clause 81. The BS of any of clauses 72 to 80, wherein the means for determining the pre-compensation to compensate for the estimated IQ impairment of the UE comprises means for determining a pre-compensation to compensate for the mismatch of phase and/or amplitude, between an I path and a Q path within the analog receiver circuitry of the UE.

Clause 82. The BS of any of clauses 72 to 81, further comprising means for continuing to use the determined pre-compensation when transmitting to the UE based on the estimated IQ impairment of the UE last received from the UE.

Clause 83. A non-transitory computer-readable medium storing computer-executable instructions that, when executed by a user equipment (UE), cause the UE to: determine an estimated in-phase (I) and quadrature phase (Q) impairment of the UE, the IQ impairment of the UE comprising a mismatch of phase and/or amplitude, between an I path and a Q path within an analog receiver circuitry of the UE; and report the estimated IQ impairment of the UE to a base station (BS).

Clause 84. The non-transitory computer-readable medium of clause 83, wherein the computer-executable instructions that, when executed, cause the UE to determine the estimated IQ impairment of the UE comprise computer-executable instructions that, when executed, cause the UE to determine an estimated IQ impairment at a specified frequency within a bandwidth supported by the UE.

Clause 85. The non-transitory computer-readable medium of any of clauses 83 to 84, wherein determining the estimated IQ impairment of the UE comprises determining an estimated IQ impairment at each of a set of one or more bandwidth parts of a bandwidth supported by the UE and wherein reporting the estimated IQ impairment of the UE to the BS comprises reporting the estimated IQ impairment at each bandwidth part in the set of one or more bandwidth parts.

Clause 86. The non-transitory computer-readable medium of any of clauses 83 to 85, wherein the computer-executable instructions that, when executed, cause the UE to report the estimated IQ impairment of the UE to the BS comprise computer-executable instructions that, when executed, cause the UE to report the estimated IQ impairment as one or more sets of complex numbers.

Clause 87. The non-transitory computer-readable medium of any of clauses 83 to 86, wherein the computer-executable instructions that, when executed, cause the UE to report the estimated IQ impairment of the UE to the BS comprise computer-executable instructions that, when executed, cause the UE to report the estimated IQ impairment as an amplitude error and/or a phase error for an entire bandwidth supported by the UE.

Clause 88. The non-transitory computer-readable medium of any of clauses 83 to 87, wherein the computer-executable instructions that, when executed, cause the UE to report the estimated IQ impairment of the UE to the BS comprise computer-executable instructions that, when executed, cause the UE to report the estimated IQ impairment as one or more sets, each set describing an amplitude error and/or phase error of one or more bandwidth parts of a bandwidth supported by the UE.

Clause 89. The non-transitory computer-readable medium of any of clauses 83 to 88, wherein the computer-executable instructions that, when executed, cause the UE to report the estimated IQ impairment of the UE to the BS comprise computer-executable instructions that, when executed, cause the UE to report the estimated IQ impairment as a first set describing an amplitude error and/or phase error common to all of the one or more bandwidth parts and one or more second sets, each second set describing an amplitude error and/or phase error of each of one or more bandwidth parts of a bandwidth supported by the UE as an absolute value or as a difference from the amplitude error and/or phase error described in the first set.

Clause 90. The non-transitory computer-readable medium of any of clauses 83 to 89, wherein the computer-executable instructions that, when executed, cause the UE to report the estimated IQ impairment of the UE to the BS comprise computer-executable instructions that, when executed, cause the UE to report the estimated IQ impairment as a first set describing a frequency-independent amplitude error and/or phase error and a second set describing a frequency-dependent amplitude error and/or phase error.

Clause 91. The non-transitory computer-readable medium of any of clauses 83 to 90, wherein the computer-executable instructions that, when executed, cause the UE to report the estimated IQ impairment of the UE to the BS comprise computer-executable instructions that, when executed, cause the UE to provide a description of a filter configuration to be used by the BS, the filter description comprising a description of a filter architecture, a number of taps, one or more filter coefficients, or a combination thereof.

Clause 92. The non-transitory computer-readable medium of any of clauses 83 to 91, wherein the determining and reporting steps are repeated periodically.

Clause 93. The non-transitory computer-readable medium of any of clauses 83 to 92, wherein the determining and reporting steps are performed in response to detecting a trigger condition.

Clause 94. The non-transitory computer-readable medium of clause 93, wherein the detecting the trigger condition comprises detecting a change in a network condition, detecting a change in an operating condition of the UE, receiving an instruction from a network entity to perform the determining and reporting steps, detecting an expiry of a timer configured to periodically trigger performing the determining and reporting steps.

Clause 95. The non-transitory computer-readable medium of any of clauses 83 to 94, wherein the one or more instructions further cause the UE to: receive a transmission from the BS, the transmission being pre-compensated to compensate for the estimated IQ impairment of the UE.

Clause 96. The non-transitory computer-readable medium of clause 95, wherein the one or more instructions further cause the UE to: repeat the determining, reporting, and receiving steps until determining that at least one of an IQ impairment, a bit error rate (BER), a mean square error (MSE), a signal to noise ratio (SNR), a signal and interference to noise ratio (SINR), a total harmonic distortion (THD), or an error vector magnitude (EVM) satisfies a threshold value.

Clause 97. The non-transitory computer-readable medium of any of clauses 95 to 96, wherein the one or more instructions further cause the UE to: dynamically adjust a configuration of a receiver digital filter in response to changes in the estimated IQ impairment of the UE.

Clause 98. The non-transitory computer-readable medium of clause 97, wherein the computer-executable instructions that, when executed, cause the UE to dynamically adjust the configuration of the receiver digital filter in response to changes in the estimated IQ impairment of the UE comprise computer-executable instructions that, when executed, cause the BS to: decrease the number of filter taps used by the receiver digital filter in response to a decrease in estimated IQ impairment of the UE; increase the number of filter taps used by the receiver digital filter in response to an increase in estimated IQ impairment of the UE; or disable, eliminating, or bypassing the receiver digital filter.

Clause 99. A non-transitory computer-readable medium storing computer-executable instructions that, when executed by a BS, cause the BS to: receive, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE; determine a pre-compensation to compensate for the estimated IQ impairment of the UE; and use the determined pre-compensation when transmitting to the UE.

Clause 100. The non-transitory computer-readable medium of clause 99, wherein the computer-executable instructions that, when executed, cause the BS to receive the estimated IQ impairment of the UE comprise computer-executable instructions that, when executed, cause the BS to receive an estimated IQ impairment at a specified frequency within a bandwidth supported by the UE.

Clause 101. The non-transitory computer-readable medium of any of clauses 99 to 100, wherein the computer-executable instructions that, when executed, cause the BS to receive the estimated IQ impairment of the UE comprise computer-executable instructions that, when executed, cause the BS to receive an estimated IQ impairment at each of a set of one or more bandwidth parts of a bandwidth supported by the UE.

Clause 102. The non-transitory computer-readable medium of clause 101, wherein the set of bandwidth parts comprises one bandwidth part incorporating all or part of the bandwidth supported by the UE, or two or more bandwidth parts, each bandwidth part incorporating a different subset of the bandwidth supported by the UE.

Clause 103. The non-transitory computer-readable medium of any of clauses 99 to 102, wherein the computer-executable instructions that, when executed, cause the BS to receive the estimated IQ impairment of the UE to the BS comprise computer-executable instructions that, when executed, cause the BS to receive the estimated IQ impairment of the UE as one or more sets of complex numbers.

Clause 104. The non-transitory computer-readable medium of any of clauses 99 to 103, wherein the computer-executable instructions that, when executed, cause the BS to report the estimated IQ impairment of the UE to the BS comprise computer-executable instructions that, when executed, cause the BS to report the estimated IQ impairment as an amplitude error and/or a phase error for an entire bandwidth supported by the UE.

Clause 105. The non-transitory computer-readable medium of any of clauses 99 to 104, wherein the computer-executable instructions that, when executed, cause the BS to report the estimated IQ impairment of the UE to the BS comprise computer-executable instructions that, when executed, cause the BS to report the estimated IQ impairment as one or more sets, each set describing an amplitude error and/or phase error of one or more bandwidth parts of a bandwidth supported by the UE.

Clause 106. The non-transitory computer-readable medium of any of clauses 99 to 105, wherein the computer-executable instructions that, when executed, cause the BS to report the estimated IQ impairment of the UE to the BS comprise computer-executable instructions that, when executed, cause the BS to report the estimated IQ impairment as a first set describing an amplitude error and/or phase error common to all of the one or more bandwidth parts and one or more second sets, each second set describing an amplitude error and/or phase error of each of one or more bandwidth parts of a bandwidth supported by the UE, as an absolute error or as a difference from the amplitude error and/or phase error described in the first set.

Clause 107. The non-transitory computer-readable medium of any of clauses 99 to 106, wherein the computer-executable instructions that, when executed, cause the BS to report the estimated IQ impairment of the UE to the BS comprise computer-executable instructions that, when executed, cause the BS to report the estimated IQ impairment as a first set describing a frequency-independent amplitude error and/or phase error and a second set describing a frequency-dependent amplitude error and/or phase error.

Clause 108. The non-transitory computer-readable medium of any of clauses 99 to 107, wherein the computer-executable instructions that, when executed, cause the BS to determine the pre-compensation to compensate for the estimated IQ impairment of the UE comprise computer-executable instructions that, when executed, cause the BS to determine a pre-compensation to compensate for the mismatch of phase and/or amplitude, between an I path and a Q path within the analog receiver circuitry of the UE.

Clause 109. The non-transitory computer-readable medium of any of clauses 99 to 108, wherein the one or more instructions further cause the BS to continue to use the determined pre-compensation when transmitting to the UE based on the estimated IQ impairment of the UE last received from the UE.

Clause 110. An apparatus comprising a memory, a transceiver, and a processor communicatively coupled to the memory and the transceiver, the memory, the transceiver, and the processor configured to perform a method according to any of clauses 1 to 28.

Clause 111. An apparatus comprising means for performing a method according to any of clauses 1 to 28.

Clause 112. A non-transitory computer-readable medium storing computer-executable instructions, the computer-executable comprising at least one instruction for causing a computer or processor to perform a method according to any of clauses 1 to 28.

Additional aspects are described below:

In an aspect, a method of operating a user equipment (UE) includes determining an estimated in-phase (I) and quadrature phase (Q) impairment of the UE, the IQ impairment of the UE comprising a mismatch of phase and/or amplitude, between an I path and a Q path within an analog receiver circuitry of the UE; and reporting the estimated IQ impairment of the UE to a base station (BS).

In some aspects, determining the estimated IQ impairment of the UE comprises determining an estimated IQ impairment at a specified frequency within a bandwidth supported by the UE.

In some aspects, determining the estimated IQ impairment of the UE comprises determining an estimated IQ impairment at each of a set of bandwidth parts of a bandwidth supported by the UE and reporting the estimated IQ impairment of the UE to the BS comprises reporting the estimated IQ impairment at each bandwidth part in the set of bandwidth parts.

In some aspects, the set of bandwidth parts comprises one bandwidth part incorporating all or part of the bandwidth supported by the UE.

In some aspects, reporting the estimated IQ impairment of the UE to the BS comprises reporting the estimated IQ impairment for the one bandwidth part.

In some aspects, the set of bandwidth parts comprises two or more bandwidth parts, each bandwidth part incorporating a different subset of a bandwidth supported by the UE.

In some aspects, reporting the estimated IQ impairment of the UE to the BS comprises reporting the estimated IQ impairment for each of the two or more bandwidth parts.

In some aspects, reporting the estimated IQ impairment of the UE to the BS comprises reporting the estimated IQ impairment as one or more sets of complex numbers.

In some aspects, reporting the estimated IQ impairment of the UE to the BS comprises reporting the estimated IQ impairment as an amplitude error and/or a phase error for an entire bandwidth supported by the UE.

In some aspects, reporting the estimated IQ impairment of the UE to the BS comprises reporting the estimated IQ impairment as one or more sets, each set describing an amplitude error and/or phase error of one or more bandwidth parts of a bandwidth supported by the UE.

In some aspects, reporting the estimated IQ impairment of the UE to the BS comprises reporting the estimated IQ impairment as a first set describing an amplitude error and/or phase error common to all of the one or more bandwidth parts and one or more second sets, each second set describing an amplitude error and/or phase error of each of one or more bandwidth parts of a bandwidth supported by the UE.

In some aspects, each second set describes the amplitude error and/or phase error of each of the one or more bandwidth as a difference from the amplitude error and/or phase error described in the first set.

In some aspects, reporting the estimated IQ impairment of the UE to the BS comprises reporting the estimated IQ impairment as a first set describing a frequency-independent amplitude error and/or phase error and a second set describing a frequency-dependent amplitude error and/or phase error.

In some aspects, reporting the estimated IQ impairment of the UE to the BS comprises providing a description of a filter configuration to be used by the BS.

In some aspects, providing a description of a filter configuration comprises providing a description of a filter architecture, a number of taps, and/or filter coefficients.

In some aspects, the determining and reporting steps are repeated periodically.

In some aspects, the determining and reporting steps are performed in response to detecting a trigger condition.

In some aspects, the detecting the trigger condition comprises detecting a change in a network condition.

In some aspects, detecting the change in a network condition comprises at least one of:

determining that a bit error rate (BER), mean square error (MSE), signal to noise ratio (SNR), a signal and interference to noise ratio (SINR), a total harmonic distortion (THD), an error vector magnitude (EVM), or combinations thereof, satisfies a threshold value.

In some aspects, detecting the trigger condition comprises detecting a change in an operating condition of the UE.

In some aspects, detecting the change in an operating condition of the UE comprises determining that a power supply condition, a temperature, or a performance metric of the UE satisfies a threshold value.

In some aspects, detecting the trigger condition comprises receiving an instruction from a network entity to perform the determining and reporting steps.

In some aspects, detecting the trigger condition comprises detecting an expiry of a timer configured to periodically trigger performing the determining and reporting steps.

In some aspects, the method includes receiving a transmission from the BS, the transmission being pre-compensated to compensate for the estimated IQ impairment of the UE.

In some aspects, the method includes repeating the determining, reporting, and receiving steps until determining that the IQ impairment of the UE satisfies a threshold value.

In some aspects, the method includes repeating the determining, reporting, and receiving steps until determining that at least one of: a bit error rate (BER), mean square error (MSE), signal to noise ratio (SNR), a signal and interference to noise ratio (SINR), a total harmonic distortion (THD), an error vector magnitude (EVM), or combinations thereof, satisfies a threshold value.

In some aspects, the method includes dynamically adjusting a configuration of a receiver digital filter in response to changes in the estimated IQ impairment of the UE.

In some aspects, dynamically adjusting the configuration of the receiver digital filter in response to changes in the estimated IQ impairment of the UE comprises dynamically adjusting a number of filter taps used by the receiver digital filter.

In some aspects, dynamically adjusting the number of filter taps used by the receiver digital filter comprises: decreasing the number of filter taps used by the receiver digital filter in response to a decrease in estimated IQ impairment of the UE; and increasing the number of filter taps used by the receiver digital filter in response to an increase in estimated IQ impairment of the UE.

In some aspects, decreasing the number of filter taps used by the receiver digital filter in response to a decrease in estimated IQ impairment of the UE comprises disabling, eliminating, or bypassing the receiver digital filter.

In some aspects, reporting the estimated IQ impairment of the UE to a base station (BS) comprises reporting the estimated IQ impairment of the UE to a fifth generation (5G) new radio (NR) base station (gNB).

In an aspect, a method of operating a base station (BS) includes receiving, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE; determining a pre-compensation to compensate for the estimated IQ impairment of the UE; and using the determined pre-compensation when transmitting to the UE.

In some aspects, receiving the estimated IQ impairment of the UE comprises receiving an estimated IQ impairment at a specified frequency within a bandwidth supported by the UE.

In some aspects, receiving the estimated IQ impairment of the UE comprises receiving an estimated IQ impairment at each of a set of bandwidth parts of a bandwidth supported by the UE.

In some aspects, the set of bandwidth parts comprises one bandwidth part incorporating all or part of the bandwidth supported by the UE.

In some aspects, the set of bandwidth parts comprises two or more bandwidth parts, each bandwidth part incorporating a different subset of the bandwidth supported by the UE.

In some aspects, receiving the estimated IQ impairment of the UE to the BS comprises receiving the estimated IQ impairment of the UE as one or more sets of complex numbers.

In some aspects, reporting the estimated IQ impairment of the UE to the BS comprises reporting the estimated IQ impairment as an amplitude error and/or a phase error for an entire bandwidth supported by the UE.

In some aspects, reporting the estimated IQ impairment of the UE to the BS comprises reporting the estimated IQ impairment as one or more sets, each set describing an amplitude error and/or phase error of one or more bandwidth parts of a bandwidth supported by the UE.

In some aspects, reporting the estimated IQ impairment of the UE to the BS comprises reporting the estimated IQ impairment as a first set describing an amplitude error and/or phase error common to all of the one or more bandwidth parts and one or more second sets, each second set describing an amplitude error and/or phase error of each of one or more bandwidth parts of a bandwidth supported by the UE.

In some aspects, each second set describes the amplitude error and/or phase error of each of the one or more bandwidth as a difference from the amplitude error and/or phase error described in the first set.

In some aspects, reporting the estimated IQ impairment of the UE to the BS comprises reporting the estimated IQ impairment as a first set describing a frequency-independent amplitude error and/or phase error and a second set describing a frequency-dependent amplitude error and/or phase error.

In some aspects, determining the pre-compensation to compensate for the estimated IQ impairment of the UE comprises determining a pre-compensation to compensate for the mismatch of phase and/or amplitude, between an I path and a Q path within the analog receiver circuitry of the UE.

In some aspects, the method includes continuing to use the determined pre-compensation when transmitting to the UE based on the estimated IQ impairment of the UE last received from the UE.

In some aspects, the BS uses the estimated IQ impairment last received from the UE until the BS receives another estimated IQ impairment from the UE.

In some aspects, the BS uses the estimated IQ impairment last received from the UE until the end of a predetermined duration.

In some aspects, the BS uses the estimated IQ impairment last received from the UE until receiving an instruction from the UE to stop pre-compensating or a notification from the UE that the estimated IQ impairment last received from the UE is no longer valid.

In an aspect, a user equipment (UE) includes a memory; at least one transceiver; and at least one processor communicatively coupled to the memory and the at least one transceiver, the at least one processor configured to: determine an estimated in-phase (I) and quadrature phase (Q) impairment of the UE, the IQ impairment of the UE comprising a mismatch of phase and/or amplitude, between an I path and a Q path within an analog receiver circuitry of the UE; and report the estimated IQ impairment of the UE to a base station (BS).

In an aspect, a base station (BS) includes a memory; at least one transceiver; and at least one processor communicatively coupled to the memory and the at least one transceiver, the at least one processor configured to: receive, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE; determine a pre-compensation to compensate for the estimated IQ impairment of the UE; and use the determined pre-compensation when transmitting to the UE.

In an aspect, a user equipment (UE) includes means for determining an estimated in-phase (I) and quadrature phase (Q) impairment of the UE, the IQ impairment of the UE comprising a mismatch of phase and/or amplitude, between an I path and a Q path within an analog receiver circuitry of the UE; and means for reporting the estimated IQ impairment of the UE to a base station (BS).

In an aspect, a base station includes means for receiving, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE; means for determining a pre-compensation to compensate for the estimated IQ impairment of the UE; and means for using the determined pre-compensation when transmitting to the UE.

In an aspect, a non-transitory computer-readable medium containing instructions stored thereon, for causing at least one processor in a user equipment (UE) to: determine an estimated in-phase (I) and quadrature phase (Q) impairment of the UE, the IQ impairment of the UE comprising a mismatch of phase and/or amplitude, between an I path and a Q path within an analog receiver circuitry of the UE; and report the estimated IQ impairment of the UE to a base station (BS).

In an aspect, a non-transitory computer-readable medium containing instructions stored thereon, for causing at least one processor in a base station to: receive, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE; determine a pre-compensation to compensate for the estimated IQ impairment of the UE; and use the determined pre-compensation when transmitting to the UE.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value crossing a threshold in either direction, a value being greater than the threshold, greater than or equal to the threshold, less than the threshold, less than or equal to the threshold, equal to the threshold, not equal to the threshold, and/or the like.

Those of skill would further appreciate that the various illustrative logical blocks, modules, circuits, and algorithm steps (e.g., the logical blocks in FIGS. 7-8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and Blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of operating a user equipment (UE), the method comprising:
    determining an estimated in-phase (I) and quadrature phase (Q) impairment of the UE, the IQ impairment of the UE comprising a mismatch of phase and/or amplitude, between an I path and a Q path within an analog receiver circuitry of the UE; and
    reporting, to a base station (BS), the estimated IQ impairment of the UE as an amplitude error, a phase error, or both, between the I path and the Q path within the analog receiver circuitry of the UE.

2. The method of claim 1, wherein determining the estimated IQ impairment of the UE comprises determining an estimated IQ impairment at a specified frequency within a bandwidth supported by the UE.

3. The method of claim 1, wherein determining the estimated IQ impairment of the UE comprises determining an estimated IQ impairment at each of a set of one or more bandwidth parts of a bandwidth supported by the UE and wherein reporting the estimated IQ impairment of the UE to the BS comprises reporting the estimated IQ impairment at each bandwidth part in the set of one or more bandwidth parts.

4. The method of claim 1, wherein reporting the estimated IQ impairment of the UE to the BS comprises reporting the estimated IQ impairment as one or more sets of complex numbers.

5. The method of claim 1, wherein reporting the estimated IQ impairment of the UE to the BS comprises reporting the estimated IQ impairment as an amplitude error, a phase error, or both, for an entire bandwidth supported by the UE.

6. The method of claim 1, wherein reporting the estimated IQ impairment of the UE to the BS comprises reporting the estimated IQ impairment as one or more sets, each set describing an amplitude error, a phase error, or both, of one or more bandwidth parts of a bandwidth supported by the UE.

7. The method of claim 1, wherein reporting the estimated IQ impairment of the UE to the BS comprises reporting the estimated IQ impairment as a first set describing an amplitude error, a phase error, or both common to all of one or more bandwidth parts of a bandwidth supported by the UE and one or more second sets, each second set describing an amplitude error, a phase error, or both, of each of the one or more bandwidth parts of the bandwidth supported by the UE as an absolute value or as a difference from the amplitude error, the phase error, or both, described in the first set.

8. The method of claim 1, wherein reporting the estimated IQ impairment of the UE to the BS comprises reporting the estimated IQ impairment as a first set describing a frequency-independent amplitude error, a phase error, or both, and a second set describing a frequency-dependent amplitude error, a phase error, or both.

9. The method of claim 1, wherein reporting the estimated IQ impairment of the UE to the BS comprises providing a description of a filter configuration to be used by the BS, the description of the filter configuration comprising a description of a filter architecture, a number of taps, one or more filter coefficients, or a combination thereof.

10. The method of claim 1, wherein the determining step and the reporting step are repeated periodically.

11. The method of claim 1, wherein the determining step and the reporting step are performed in response to detecting a trigger condition.

12. The method of claim 11, wherein the detecting the trigger condition comprises detecting a change in a network condition, detecting a change in an operating condition of the UE, receiving an instruction from a network entity to perform the determining step and the reporting step, or detecting an expiry of a timer configured to periodically trigger performing the determining step and the reporting step.

13. The method of claim 1, further comprising:
receiving a transmission from the BS, the transmission being pre-compensated to compensate for the estimated IQ impairment of the UE.

14. The method of claim 13, further comprising:
repeating the determining, reporting, and receiving steps until determining that at least one of an IQ impairment, a bit error rate (BER), a mean square error (MSE), a signal to noise ratio (SNR), a signal and interference to noise ratio (SINR), a total harmonic distortion (THD), or an error vector magnitude (EVM) satisfies a threshold value.

15. The method of claim 13, further comprising:
dynamically adjusting a configuration of a receiver digital filter in response to a change in the estimated IQ impairment of the UE.

16. The method of claim 15, wherein dynamically adjusting the configuration of the receiver digital filter in response to a change in the estimated IQ impairment of the UE comprises:
decreasing a number of filter taps used by the receiver digital filter in response to a decrease in the estimated IQ impairment of the UE;
increasing the number of filter taps used by the receiver digital filter in response to an increase in the estimated IQ impairment of the UE; or
disabling, eliminating, or bypassing the receiver digital filter.

17. A method of operating a base station (BS), the method comprising:
receiving, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE, reported as an amplitude error, a phase error, or both, between the I path and the Q path within the analog receiver circuitry of the UE;
determining a pre-compensation to compensate for the estimated IQ impairment of the UE; and
using the determined pre-compensation when transmitting to the UE.

18. The method of claim 17, wherein receiving the estimated IQ impairment of the UE comprises receiving an estimated IQ impairment at a specified frequency within a bandwidth supported by the UE.

19. The method of claim 17, wherein receiving the estimated IQ impairment of the UE comprises receiving an estimated IQ impairment at each of a set of one or more bandwidth parts of a bandwidth supported by the UE.

20. The method of claim 19, wherein the set of one or more bandwidth parts comprises one bandwidth part incorporating all or part of the bandwidth supported by the UE, or two or more bandwidth parts, each bandwidth part incorporating a different subset of the bandwidth supported by the UE.

21. The method of claim 17, wherein receiving the estimated IQ impairment of the UE to the BS comprises receiving the estimated IQ impairment of the UE as one or more sets of complex numbers.

22. The method of claim 17, wherein reporting the estimated IQ impairment of the UE to the BS comprises reporting the estimated IQ impairment as an amplitude error and/or a phase error for an entire bandwidth supported by the UE.

23. The method of claim 17, wherein reporting the estimated IQ impairment of the UE to the BS comprises reporting the estimated IQ impairment as one or more sets, each set describing an amplitude error, a phase error, or both, of one or more bandwidth parts of a bandwidth supported by the UE.

24. The method of claim 17, wherein reporting the estimated IQ impairment of the UE to the BS comprises reporting the estimated IQ impairment as a first set describing an amplitude error, a phase error, or both, common to all of one or more bandwidth parts of a bandwidth supported by the UE and one or more second sets, each second set describing an amplitude error, a phase error, or both, of each of the one or more bandwidth parts of the bandwidth supported by the UE, as an absolute error or as a difference from the amplitude error, the phase error, or both, described in the first set.

25. The method of claim 17, wherein reporting the estimated IQ impairment of the UE to the BS comprises reporting the estimated IQ impairment as a first set describing a frequency-independent amplitude error, a phase error, or both, and a second set describing a frequency-dependent amplitude error, a phase error, or both.

26. The method of claim 17, wherein determining the pre-compensation to compensate for the estimated IQ impairment of the UE comprises determining the pre-compensation to compensate for the mismatch of phase and/or amplitude between the I path and the Q path within the analog receiver circuitry of the UE.

27. The method of claim 17, further comprising continuing to use the determined pre-compensation when transmitting to the UE based on the estimated IQ impairment of the UE last received from the UE.

28. The method of claim 17, wherein the BS uses the estimated IQ impairment last received from the UE until the BS receives another estimated IQ impairment from the UE, until an end of a predetermined duration, until receiving an instruction from the UE to stop pre-compensating, until receiving a notification from the UE that the estimated IQ impairment last received from the UE is no longer valid, or a combination thereof.

29. A user equipment (UE), comprising:
a memory;
at least one transceiver; and
at least one processor communicatively coupled to the memory and the at least one transceiver, the at least one processor configured to:
  determine an estimated in-phase (I) and quadrature phase (Q) impairment of the UE, the IQ impairment of the UE comprising a mismatch of phase and/or amplitude, between an I path and a Q path within an analog receiver circuitry of the UE; and
  report, to a base station (BS), the estimated IQ impairment of the UE as an amplitude error, a phase error, or both, between the I path and the Q path within the analog receiver circuitry of the UE.

30. A BS, comprising:
a memory;
at least one transceiver; and
at least one processor communicatively coupled to the memory and the at least one transceiver, the at least one processor configured to:
  receive, via the at least one transceiver, from a user equipment (UE), an estimated in-phase (I) and quadrature phase (Q) impairment at the UE, the IQ impairment of the UE comprising a mismatch of phase and/or amplitude, between an I path and a Q path within an analog receiver circuitry of the UE, reported as an amplitude error, a phase error, or both, between the I path and the Q path within the analog receiver circuitry of the UE;
  determine a pre-compensation to compensate for the estimated IQ impairment of the UE; and
  use the determined pre-compensation when transmitting to the UE.

\* \* \* \* \*